United States Patent
Kim et al.

(10) Patent No.: US 8,599,715 B2
(45) Date of Patent: Dec. 3, 2013

(54) APPARATUS AND METHOD FOR TRANSMITTING CHANNEL STATE INFORMATION IN A MOBILE COMMUNICATION SYSTEM

(75) Inventors: Eun Sun Kim, Anyang-si (KR); Hak Seong Kim, Anyang-si (KR); Han Byul Seo, Anyang-si (KR); Hyung Tae Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 121 days.

(21) Appl. No.: 13/387,356

(22) PCT Filed: Jul. 27, 2010

(86) PCT No.: PCT/KR2010/004924
§ 371 (c)(1),
(2), (4) Date: Jan. 26, 2012

(87) PCT Pub. No.: WO2011/013986
PCT Pub. Date: Feb. 3, 2011

(65) Prior Publication Data
US 2012/0147773 A1 Jun. 14, 2012

Related U.S. Application Data

(60) Provisional application No. 61/314,133, filed on Mar. 15, 2010, provisional application No. 61/285,185, filed on Dec. 10, 2009, provisional application No. 61/230,092, filed on Jul. 30, 2009.

(51) Int. Cl.
*H04W 24/00* (2009.01)

(52) U.S. Cl.
USPC ........... 370/252; 370/329; 370/310; 370/328; 455/450

(58) Field of Classification Search
USPC .................................................. 370/329, 252
See application file for complete search history.

(56) References Cited

U.S. PATENT DOCUMENTS

| | | | |
|---|---|---|---|
| 7,990,919 B2 * | 8/2011 | Kotecha | 370/329 |
| 8,300,587 B2 * | 10/2012 | Chmiel et al. | 370/329 |
| 8,363,611 B2 * | 1/2013 | Ho et al. | 370/329 |
| 8,411,633 B2 * | 4/2013 | Seo et al. | 370/329 |
| 2007/0202882 A1 | 8/2007 | Ju et al. | |
| 2007/0237167 A1 | 10/2007 | Kaneko et al. | |
| 2010/0322176 A1 * | 12/2010 | Chen et al. | 370/329 |
| 2011/0019776 A1 * | 1/2011 | Zhang et al. | 375/340 |
| 2011/0170435 A1 * | 7/2011 | Kim et al. | 370/252 |
| 2011/0211522 A1 * | 9/2011 | Chung et al. | 370/315 |

(Continued)

OTHER PUBLICATIONS

3GPP TR 36.814 ver. 0.4.1 (Feb. 2009).*

*Primary Examiner* — Mark Rinehart
*Assistant Examiner* — Peter Solinsky
(74) *Attorney, Agent, or Firm* — Lee, Hong, Degerman, Kang & Waimey

(57) ABSTRACT

A apparatus and method for transmitting channel state information is disclosed. If an LTE-A system transmits a reference signal per subframe to support eight transmitting antennas, a problem occurs in that overhead is great. In order to solve this problem, a reference signal for channel measurement is transmitted per subband at different periods, or a user equipment scheduled for channel measurement uses a demodulation reference signal. The user equipment can notify a base station of channel measurement result using the demodulation reference signal in accordance with implicit or explicit signaling from the base station.

20 Claims, 15 Drawing Sheets

(56) References Cited

U.S. PATENT DOCUMENTS

| | | | |
|---|---|---|---|
| 2011/0223927 A1* | 9/2011 | Seo et al. | 455/450 |
| 2012/0020311 A1* | 1/2012 | Yamada et al. | 370/329 |
| 2012/0033608 A1* | 2/2012 | Seo et al. | 370/315 |
| 2012/0051451 A1* | 3/2012 | Kwon et al. | 375/285 |
| 2012/0082119 A1* | 4/2012 | Chung et al. | 370/329 |
| 2012/0099536 A1* | 4/2012 | Lee et al. | 370/328 |
| 2012/0113889 A1* | 5/2012 | Noh et al. | 370/315 |
| 2012/0114021 A1* | 5/2012 | Chung et al. | 375/211 |
| 2013/0089065 A1* | 4/2013 | Koorapaty et al. | 370/330 |
| 2013/0157667 A1* | 6/2013 | Nakamura et al. | 455/440 |
| 2013/0163571 A1* | 6/2013 | Ouchi et al. | 370/336 |

* cited by examiner (a) contol - plane protocol stack (b) user - plane protocol stack (a)

| DL grant | CSI report field |
|---|---|

CQI report field = 0 : default
CQI report field = 1 : CQI report request based on DM-RS

APPARATUS AND METHOD FOR TRANSMITTING CHANNEL STATE INFORMATION IN A MOBILE COMMUNICATION SYSTEM

CROSS-REFERENCE TO RELATED APPLICATIONS

This application is the National Stage filing under 35 U.S.C. 371 of International Application No. PCT/KR2010/004924, filed on Jul. 27, 2010, which claims the benefit of U.S. Provisional Application Ser. Nos. 61/314,133, filed on Mar. 15, 2010, 61/285,185, filed on Dec. 10, 2009, and 61/230,092, filed on Jul. 30, 2009, the contents of which are all incorporated by reference herein in their entirety.

TECHNICAL FIELD

The present invention relates to a mobile communication system, and more particularly, to an apparatus and method for transmitting channel state information.

BACKGROUND ART

A 3rd generation partnership project long term evolution (3GPP LTE), LTE-Advanced (hereinafter, referred to as 'LTE-A') communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS system is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify time and frequency domains to which data will be transmitted and information related to encoding, data size, hybrid automatic repeat and request (HARQ). Also, the base station transmits uplink (UL) scheduling information of uplink data to the corresponding user equipment to notify time and frequency domains that can be used by the corresponding user equipment, and information related to encoding, data size, HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

Recently, standardization of advanced technology of LTE is in progress under the 3rd Generation Partnership Project (3GPP). This technology will be referred to as "LTE-Advanced" or "LTE-A." One of important differences between the LTE system and the LTE-A system is difference in system bandwidth. The LTE-A system aims to support a wideband of maximum 100 MHz. To this end, the LTE-A system uses carrier aggregation or bandwidth aggregation that achieves a wideband using a plurality of frequency blocks. For wider frequency bandwidth, the carrier aggregation aims to use a plurality of frequency blocks as one great logical frequency band. A bandwidth of each frequency block can be defined based on a bandwidth of a system block used in the LTE system. Each frequency block is transmitted using a component carrier.

The aforementioned next generation LTE-A system should support eight transmitting antennas. However, the current method for transmitting a reference signal has a problem in that overhead is too great. In this respect, a solution for this problem is required. However, there are no detailed suggestions until now.

DISCLOSURE OF INVENTION

Technical Problem

Accordingly, the present invention is directed to an apparatus and method for transmitting channel state information in a mobile communication system, which substantially obviates one or more problems due to limitations and disadvantages of the related art.

An object of the present invention is to provide a method for transmitting channel state information of a user equipment in a mobile communication system.

Another object of the present invention is to provide a user equipment for transmitting channel state information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method for transmitting channel state information at a user equipment in a mobile communication system comprises receiving a physical downlink control channel (PDCCH) from a base station (BS) through a first downlink subframe, the PDCCH including information indicating DeModulation-Reference Signal (DM-RS) based channel state report or not; receiving a physical downlink shared channel (PDSCH) through the first downlink subframe, the PDSCH including the DM-RS and data; measuring channel state using the received DM-RS if the information indicates the DM-RS based channel state report; and transmitting the measured channel state information to the base station through a first uplink subframe.

The method further comprises receiving a channel state information-RS (CSI-RS) from the base station through a specific subband of a second downlink subframe; and measuring channel state for the specific subband by using the received CSI-RS and transmitting the measured channel state to the base station through a second uplink subframe, wherein the first downlink subframe is a subframe scheduled for the user equipment by the CSI-RS based channel state report.

The information indicating the DM-RS based channel state report or not is a downlink assignment message type, and indicating the DM-RS based channel state report or not is included in a channel quality information (CQI) report field within the downlink assignment message.

The information indicating the DM-RS based channel state report or not is expressed by any one of a scrambling code or specific cyclic redundancy check (CRC) masking applied to the PDCCH defined previously, MCS level included in the PDCCH, resource block (RB) size, and combination of redundancy version (RV).

The step of transmitting the measured channel state information to the base station through a first uplink subframe includes transmitting ACK (ACKnowledgment) signal or NACK (Non-ACKnowledgement) signal indicating whether the PDSCH of the first downlink subframe has been successfully received, together with the measured channel state information.

The user equipment transmits the ACK or NACK signal and the channel state information measured based on the DM-RS through different PUCCHs previously defined.

The method further comprises receiving information of different PUCCHs previously defined, from the base station through higher layer signaling.

The user equipment transmits the ACK or NACK signal and the channel state information measured based on the DM-RS through an uplink resource indicated by one or more CCEs of the PDCCH.

An interval between the first downlink subframe and the first uplink subframe corresponds to four subframes.

In another aspect of the present invention, a user equipment for transmitting channel state information in a mobile communication system, the user equipment comprises a module receiving a physical downlink control channel (PDCCH) from a base station through a first downlink subframe, the PDCCH including information indicating DeModulation-Reference Signal (DM-RS) based channel state report or not; a module receiving a physical downlink shared channel (PDSCH) through the first downlink subframe, the PDSCH including the DM-RS and data; a processor measuring channel state using the received DM-RS if the information indicates the DM-RS based channel state report; and a module transmitting the measured channel state information to the base station through a first uplink subframe.

Advantageous Effects of Invention

According to the embodiments of the present invention, since the user equipment measures channel state using a demodulation reference signal received from the base station and feeds the measured channel state back to the base station, overhead caused by transmission of a reference signal can be reduced remarkably, whereby communication throughput can be improved.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 is a diagram illustrating explicit signaling of a PDCCH for DM-RS based CSI (or CQI) report in a 3GPP LTE-A system which is an example of a mobile communication system;

BEST MODE FOR CARRYING OUT THE INVENTION

Figure 1:
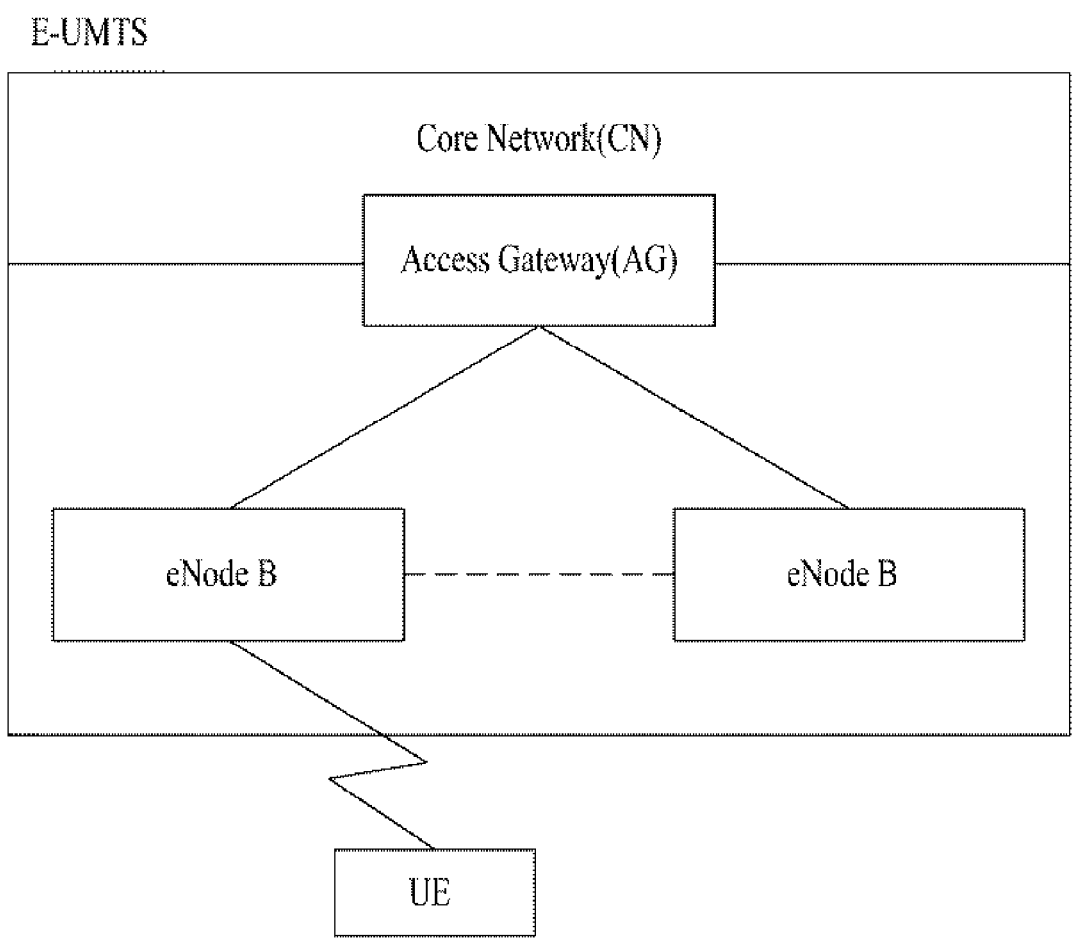
FIG. 1 is a diagram illustrating a network structure of an Evolved Universal Mobile Telecommunications System (E-UMTS) which is an example of a mobile communication system.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system corresponding to a 3GPP LTE system, the following description can be applied to other mobile communication systems except unique features of the 3GPP LTE system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a user equipment designates a mobile or fixed type user terminal such as a mobile station (MS) and an advanced mobile station (AMS). It is also assumed that a base station designates a random node of a network node, such as Node B, eNode B and access point (AP), which performs communication with the user equipment.

The following technology can be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA can be implemented by radio technology such as universal terrestrial radio access (UTRA) or CDMA2000. The TDMA can be implemented by radio technology such as global system for mobile communications (GSM)/general packet radio service (GPRS)/enhanced data rates for GSM evolution (EDGE). OFDMA can be implemented by radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE.

Although the following description will be based on the 3GPP LTE, LTE-A system to clarify description, it is to be understood that technical spirits of the present invention are not limited to the 3GPP LTE, LTE-A system.

In a mobile communication system, the user equipment can receive information from the base station through a downlink and also transmit information to the base station through an uplink. Examples of information transmitted from or received in the mobile station include data and various kinds of control information. Various physical channels exist depending on types and uses of the information transmitted from or received in the mobile station.

Figure 2:
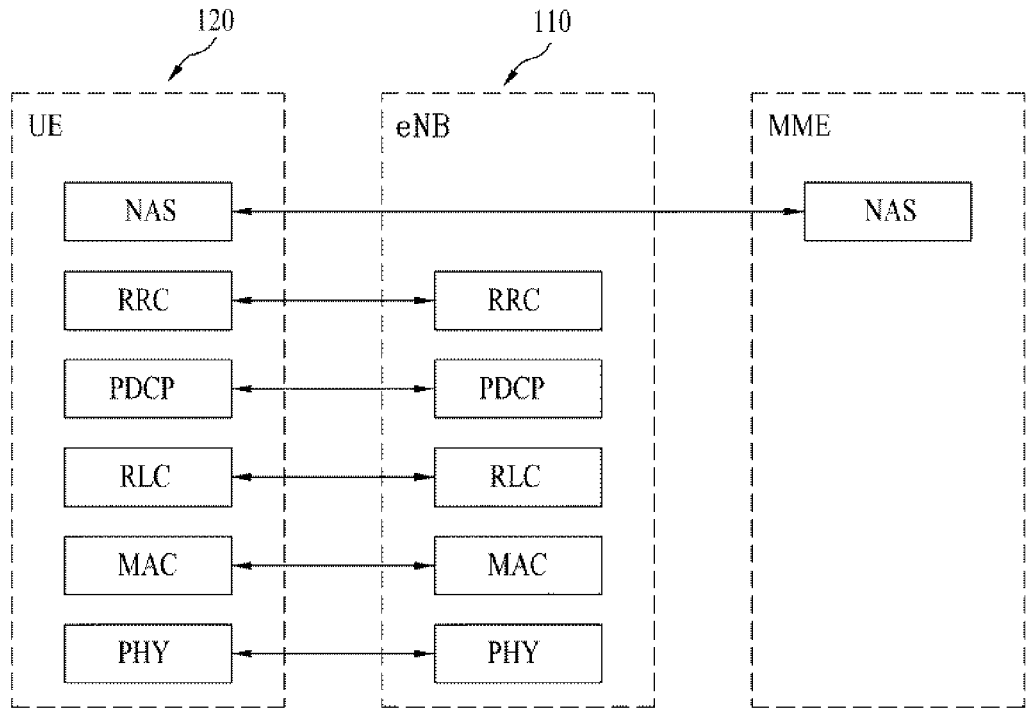
FIG. 2 is a diagram illustrating structures of a control plane and a user plane of a radio interface protocol between one user equipment and E-UTRAN based on the 3GPP radio access network standard.
Figure 2:
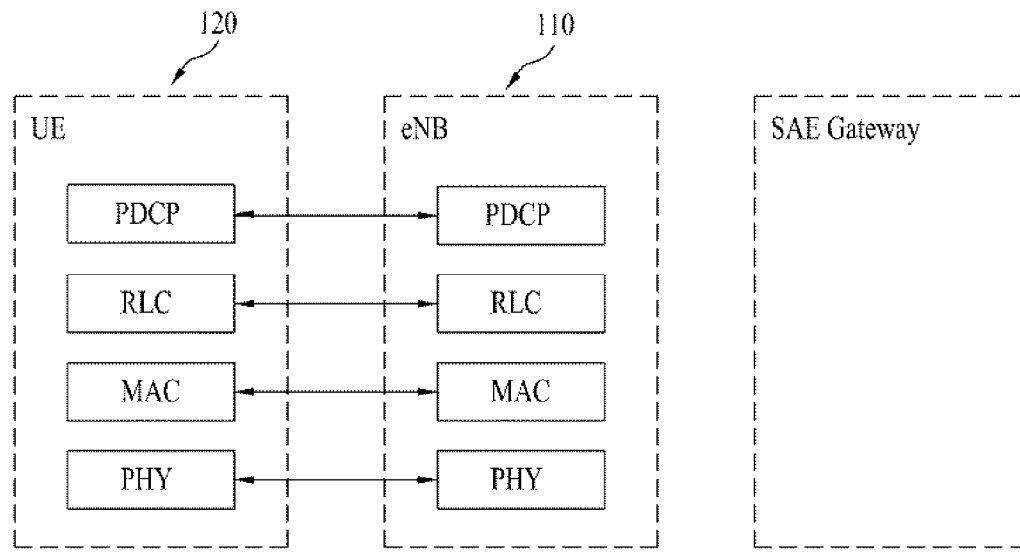

FIG. 2 is a diagram illustrating structures of a control plane and a user plane of a radio interface protocol between a user equipment and E-UTRAN based on the 3GPP radio access network standard.

Referring to FIG. 2, the control plane means a passageway where control messages are transmitted, wherein the control messages are used in the user equipment and the network to manage call. The user plane means a passageway where data generated in an application layer, for example, voice data or Internet packet data are transmitted. Hereinafter, respective layers of the control plane and the user plane of the radio protocol will be described.

The physical layer as the first layer provides an information transfer service to an higher layer using a physical channel. The physical layer (PHY) is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC layer) above the MAC layer via logical channels. The RLC layer of the second layer supports reliable data transfer. The RLC layer may be implemented as a functional block inside the MAC layer. In order to effectively transmit data using IP packets (e.g., IPv4 or IPv6) within a radio interface having a narrow bandwidth, a packet data convergence protocol (PDCP) layer of the second layer (L2) performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting eNB 220 is established at one of bandwidths of 1.25, 2.5, 5, 10, 15, and 20 Mhz and provides a downlink or uplink transmission service to several user equipments. At this time, different cells can be established to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
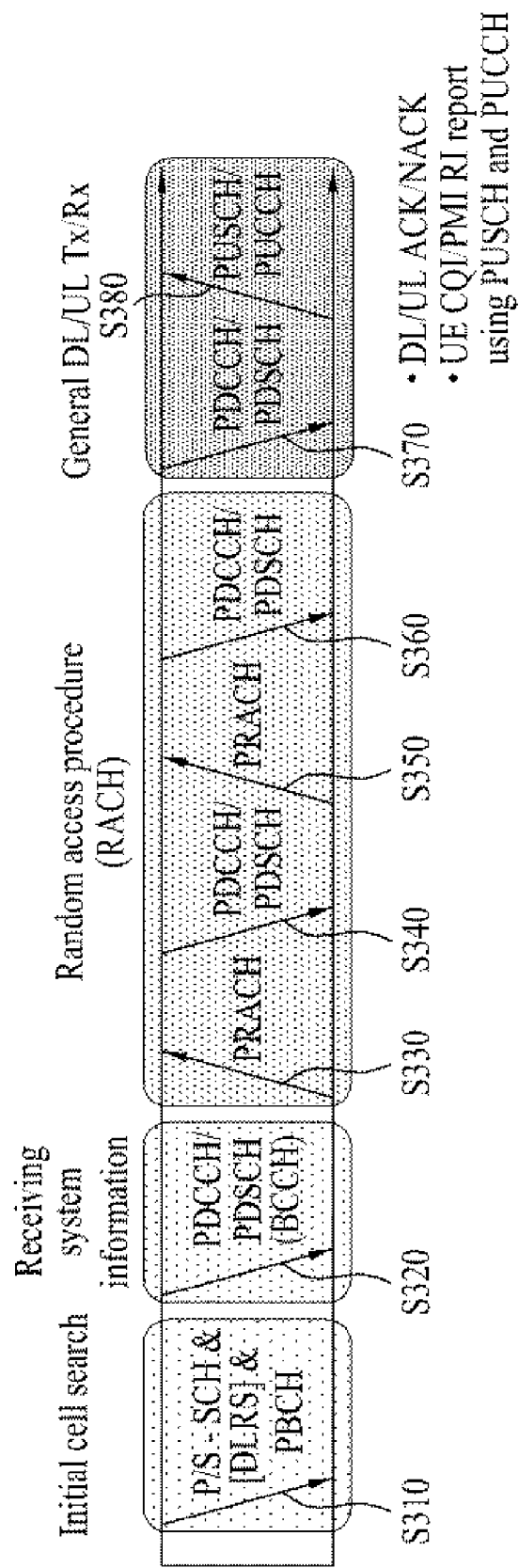
FIG. 3 is a diagram illustrating physical channels used in a 3GPP system and a method for transmitting a general signal using the physical channel.

FIG. 3 is a diagram illustrating physical channels used in a 3GPP system and a method for transmitting a general signal using the physical channel.

Referring to FIG. 3, upon power-on or when a UE initially enters a cell, the UE performs an initial cell search involving synchronization of its timing to an eNB in step S310. For the initial cell search, the UE may be synchronized to the eNB and acquire information such as a cell Identifier (ID) by receiving a Primary Synchronization CHannel (P-SCH) and a Secondary Synchronization CHannel (S-SCH). Then the UE may receive broadcast information from the cell on a Physical Broadcast CHannel (PBCH). In the mean time, the UE may determine a downlink channel status by receiving a DownLink Reference Signal (DL RS) during the initial cell search.

After the initial cell search, the UE may acquire more specific system information by receiving a Physical Downlink Control CHannel (PDCCH) and receiving a Physical Downlink Shared CHannel (PDSCH) based on information of the PDCCH in step S320.

On the other hand, if the UE had not access the eNB or if the UE does not have radio resource to transmit signals, it may perform a random access procedure to the eNB in steps S330 to S360. For the random access, the UE may transmit a predetermined sequence as a preamble to the eNB on a Physical Random Access CHannel (PRACH) in step S330 and receive a response message for the random access on a PDCCH and a PDSCH corresponding to the PDCCH in step S340. In the case of contention-based random access other than handover, the UE may perform a contention resolution procedure by further transmitting the PRACH in step S350 and receiving a PDCCH and its related PDSCH in step S360.

After the foregoing procedure, the UE may receive a PDCCH and a PDSCH in step S370 and transmit a Physical Uplink Shared CHannel (PUSCH) and a Physical Uplink Control CHannel (PUCCH) in step S380, as a general downlink/uplink signal transmission procedure. Here, the control signal transmitted from UE to eNB and the control signal transmitted from UE to eNB comprise an ACK/NACK signal, a channel quality indicator (CQI), precoding matrix index (PMI) and/or a rank indicator (RI). The UE adapted to operate in the 3GPP LTE (3rd Generation Partnership Project Long Term Evolution) may transmit the control signal, such as CQI/PMI/RI though the PUSCH and/or the PUCCH.

Figure 4:
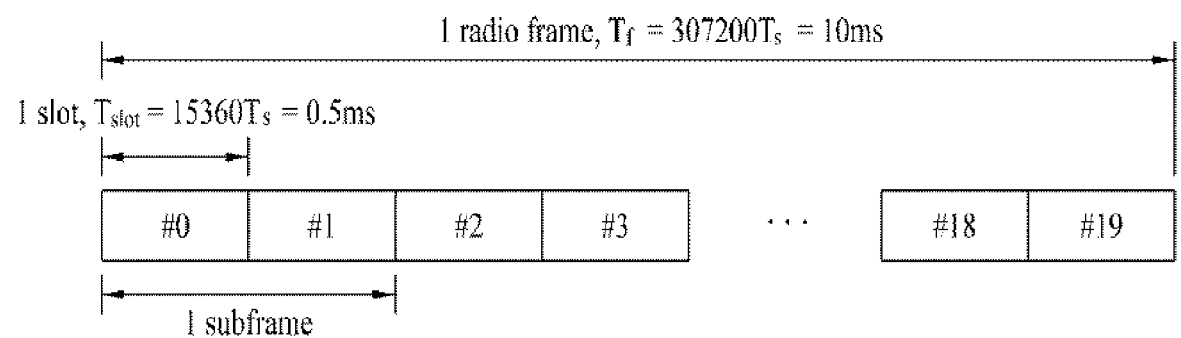
FIG. 4 is a diagram illustrating a structure of a radio frame used in a 3GPP LTE system which is an example of a mobile communication system.

FIG. 4 is a diagram illustrating a structure of a radio frame used in a 3GPP LTE system which is an example of a mobile communication system.

Referring to the FIG. 4, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 5:
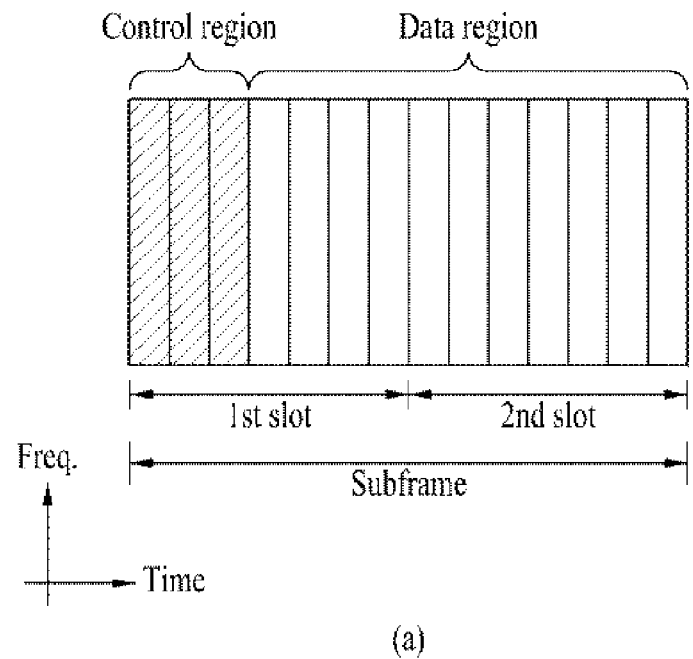
FIG. 5 is a diagram illustrating a structure of a downlink subframe of a 3GPP LTE system which is an example of a mobile communication system.
Figure 5:
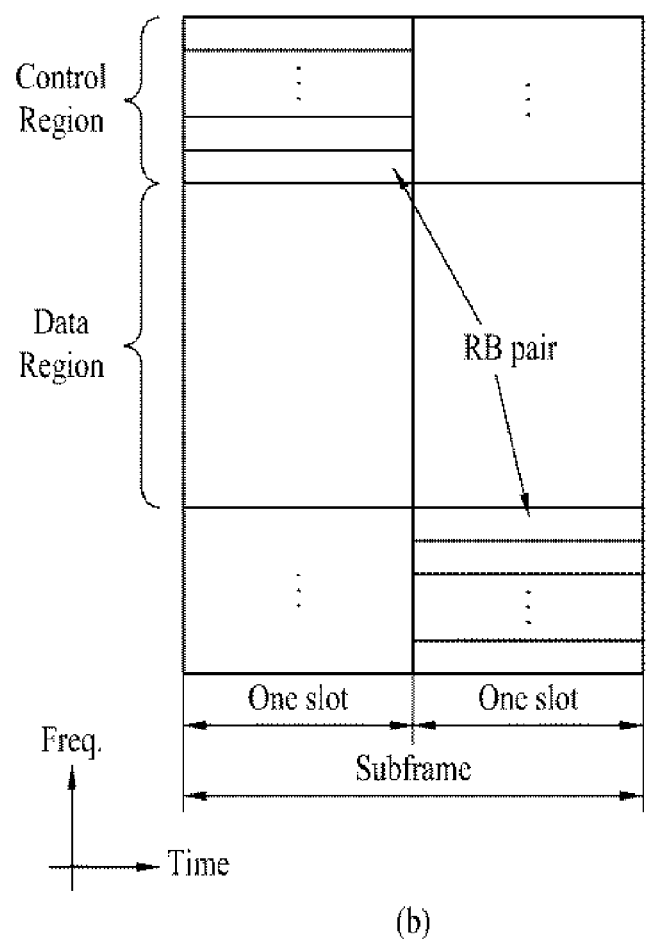

FIG. 5 is a diagram illustrating a structure of a downlink subframe of a 3GPP LTE system which is an example of a mobile communication system.

Referring to the FIG. 5(a), a maximum of three OFDM symbols located in a front portion of a 1st slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

Now, a PDCCH that is a downlink physical channel will be described.

The PDCCH can carry a PDSCH's resource assignment and transport format (referred to as a downlink grant), PUSCH's resource assignment information (referred to as an uplink grant), a transmit power control command for individual UEs within any UE group, activation of a voice over Internet (VoIP), etc. A plurality of PDCCHs can be transmitted in a control region, and the UE can monitor the plurality of PDCCHs. The PDCCH consists of an aggregation of one or several consecutive control channel elements (CCEs). The PDCCH consisting of the aggregation of one or several consecutive CCEs can be transmitted on a control region after being processed with subblock interleaving. The CCE is a logical assignment unit used to provide the PDCCH with a coding rate depending on a wireless channel condition. The CCE corresponds to a plurality of resource element groups. According to an association relation between the number of CCEs and a coding rate provided by the CCEs, a format of the PDCCH and the number of bits of an available PDCCH are determined.

Control information transmitted over the PDCCH is referred to as downlink control information (DCI). The following table shows the DCI according to a DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |

TABLE 1-continued

| DCI Format | Description |
| --- | --- |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

A DCI format 0 indicates uplink resource assignment information. DCI formats 1 to 2 indicate downlink resource assignment information. DCI formats 3 and 3A indicate an uplink transmit power control (TPC) command for any UE groups.

The following table shows information elements included in the DCI format 0 that is uplink resource assignment information (or an uplink grant). Section 5.3.3.1 of the 3GPP TS 36.212 V8.3.0 (2008-05) "Technical Specification Group Radio Access Network; Evolved Universal Terrestrial Radio Access (E-UTRA); Multiplexing and channel coding (Release 8)" may be incorporated herein by reference.

Referring to the FIG. 5(b), an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Figure 6:
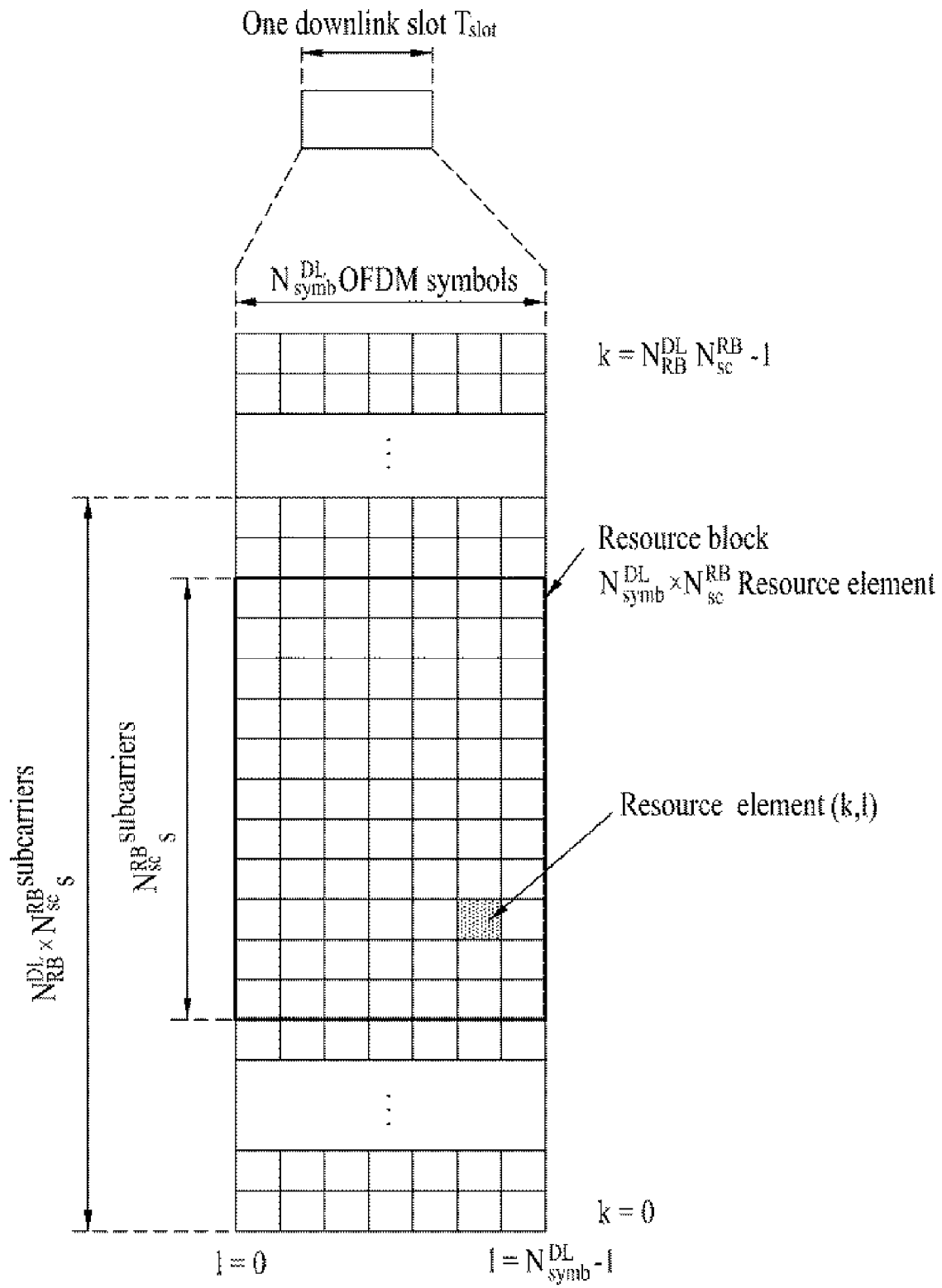
FIG. 6 is a diagram illustrating a downlink time-frequency resource grid structure used in a 3GPP LTE system which is an example of a mobile communication system.

FIG. 6 is a diagram illustrating a downlink time-frequency resource grid structure used in a 3GPP LTE system which is an example of a mobile communication system.

Referring to the FIG. 6, The transmitted signal in each slot is described by a resource grid of $N_{RB}^{DL} \times N_{SC}^{RB}$ subcarriers and $N_{symb}^{DL}$ OFDM symbols. Here, $N_{RB}^{DL}$ represents for the number of resource blocks (RBs) for downlink, $N_{SC}^{RB}$ represents for the number of subcarriers constituting a RB, and $N_{symb}^{DL}$ represents for the number of OFDM symbols in a downlink slot. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$ where $N_{RB}^{min,DL}$ and $N_{RB}^{max,RB}$, though not limited to these values, are the smallest and largest downlink bandwidth, respectively. Here, $N_{RB}^{min,DL}$ is the minimum downlink bandwidth and $N_{RB}^{max,RB}$ the maximum downlink bandwidth supported by the wireless communication system. The number of OFDM symbols in a slot depends on the cyclic prefix (CP) length and subcarrier spacing. In case of multi-antenna transmission, there may be one resource grid defined per antenna port.

Each element in the resource grid for antenna port p is called a resource element and is uniquely identified by the index pair (k,l) in a slot where k=0, ..., $N_{RB}^{DL}N_{SC}^{RB}-1$ and l=0, ..., $N_{symb}^{DL}-1$ are the indices in the frequency and time domains, respectively.

Resource blocks shown in FIG. 6 are used to describe the mapping of certain physical channels to resource elements. RB is classified into physical resource block (PRB) and virtual resource block (VRB).

A physical resource block is defined as $N_{symb}^{DL}$ consecutive OFDM symbols in the time domain and $N_{SC}^{RB}$ consecutive subcarriers in the frequency domain, where $N_{symb}^{DL}$ and $N_{SC}^{RB}$ may be given by Table 2. A physical resource block thus consists of $N_{symb}^{DL} \times N_{SC}^{RB}$ resource elements, corresponding to one slot in the time domain and 180 kHz in the frequency domain, though not limited to these values.

TABLE 2

| Configuration | | $N_{sc}^{RB}$ | $N_{symb}^{DL}$ |
| --- | --- | --- | --- |
| Normal cyclic prefix | Δf = 15 kHz | 12 | 7 |
| Extended cyclic prefix | Δf = 15 kHz | | 6 |
| | Δf = 7.5 kHz | 24 | 3 |

Physical resource blocks are numbered from 0 to $N_{RB}^{DL}-1$ in the frequency domain. The relation between the physical resource block number in the frequency domain and resource elements (k,l) in a slot is given by $$n_{PRB} = \left\lfloor \frac{k}{N_{sc}^{RB}} \right\rfloor$$

A VRB can have the same size as that of the PRB. There are two types of VRBs defined, the first one being a localized type and the second one being a distributed type. For each VRB type, a pair of VRBs have a single VRB index in common (may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL}-1$, and $N_{RB}^{DL}$ VRBs belonging to a second one of the two slots are likewise each assigned any one index of 0 to $N_{RB}^{DL}-1$.

The resource structure shown in FIG. 6 can be applied to the uplink in a substantially same way. However, the time domain unit in the uplink adapting SC-FDMA can be SC-FDMA symbol instead of OFMA symbol.

Hereinafter, a reference signal (RS) transmitted and received between a transmitter and a receiver in a mobile communication system will be described. For example, in the downlink, the transmitter is corresponding to base station and the receiver is corresponding to user equipment.

In the mobile communication system, when the transmitter transmits a packet (or signal) to the receiver, since the packet is transmitted through a radio channel, signal distortion may occur during transmission of the packet. In order to correctly receive the distorted signal, the receiver should discover channel information to compensate for distortion of the signal as much as the channel information, thereby receiving the signal correctly. In order to discover the channel information, it is required to transmit the signal known by both the transmitter and the receiver. Namely, when the signal known by the receiver is received through the channel, a method for discovering information of the channel using a distortion level of the signal is mainly used. At this time, the signal known by both the transmitter and the receiver will be referred to as a reference signal or a pilot signal.

One transmitting antenna and one receiving antenna have been used conventionally when the transmitter transmits a packet to the receiver. However, in most of mobile communication systems, a method for improving data rate efficiency using multiple transmitting antennas and multiple receiving antennas is used. In the case that the transmitter or receiver of the mobile communication system transmits and receives data using multiple antennas to increase capacity and improve communication throughput, a separate reference signal is provided per transmitting antenna. The receiver can correctly receive the signal transmitted from each transmitting antenna by using the reference signal per transmitting antenna, wherein the reference signal is the one known by the receiver.

In the mobile communication system, the reference signal can be divided into two types. Namely, examples of the reference signal include a reference signal intended for acquisition of channel information and a reference signal intended for data demodulation. Since the former reference signal is intended for acquisition of channel information, it needs to be transmitted through a broadband, and should be received and measured even by a user equipment that does not receive downlink data for a specific subframe. Also, this reference signal for channel measurement can also be used for measurement of handover. The latter reference signal is transmitted from the base station together with a corresponding resource when the base station transmits a downlink signal. In this case, the user equipment can estimate a channel by receiving the corresponding reference signal and demodulate data. This reference signal for demodulation should be transmitted to a region to which data are transmitted.

In a Release 8 LTE system which is an example of a mobile communication system, two types of downlink reference signals are defined for unicast service. There are provided two types of reference signals, i.e., a common reference signal (CRS) for acquisition of channel state information and measurement of handover and a dedicated reference signal (DRS) (corresponding to UE-specific reference signal) used for data demodulation. In the Release 8 LTE system, the UE-specific reference signal is only used for data demodulation, and the CRS is used for both acquisition of channel information and data demodulation. The CRS is a cell-specific reference signal, and is transmitted by the base station per subframe through a broadband. The cell-specific CRS is transmitted as a reference signal for maximum four antenna ports depending on the number of transmitting antennas of the base station. For example, if the number of transmitting antennas of the base station is 2, the CRSs for antenna port 0 and antenna port 1 are transmitted. If the number of transmitting antennas of the base station is 4, the CRSs for antenna port 0 to 3 are respectively transmitted. A CRS pattern at one resource block (RB) when the number of transmitting antennas of the base station is 4 is as shown in FIG. 7.

Figure 7:
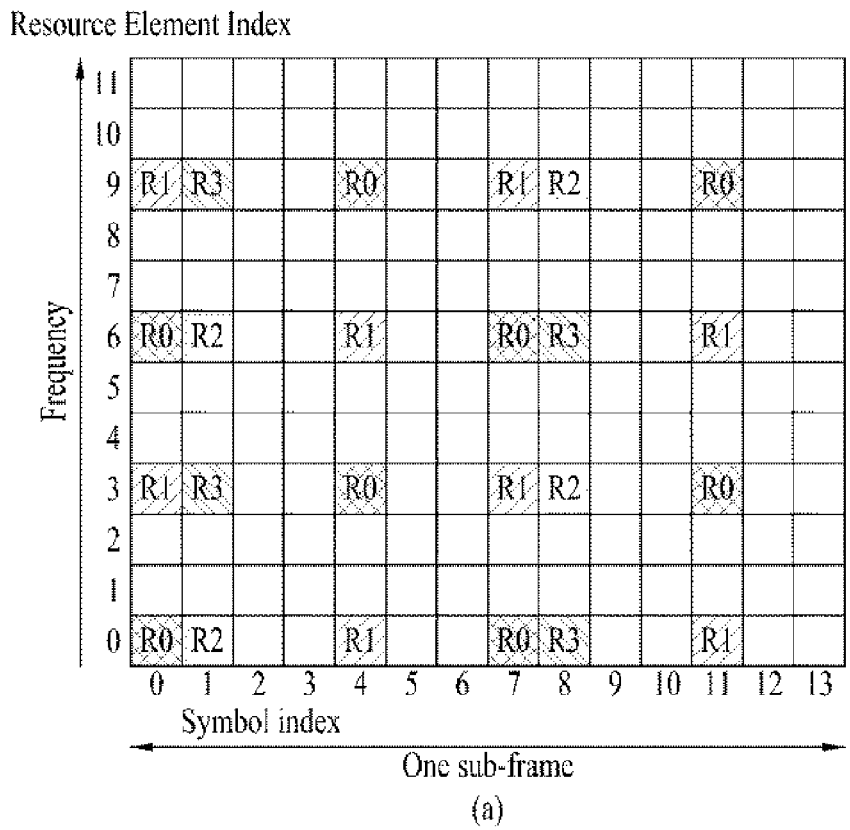
FIG. 7 is a diagram illustrating a CRS pattern in a 3GPP LTE system which is an example of a mobile communication system.
Figure 7:
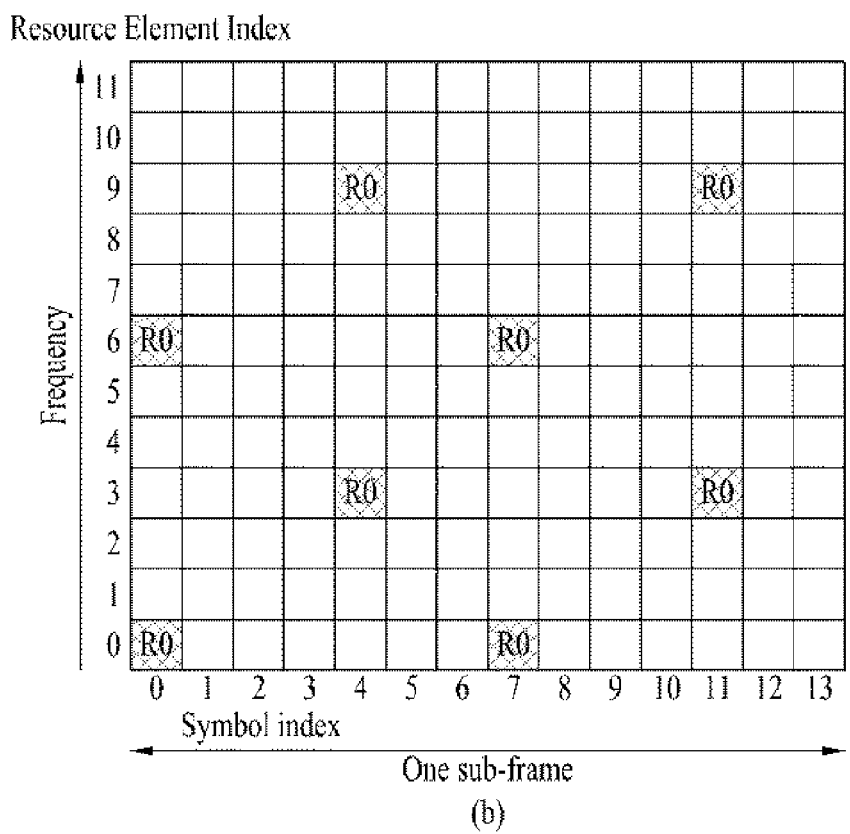

FIG. 7 is a diagram illustrating a CRS pattern in a 3GPP LTE system which is an example of a mobile communication system.

As shown in FIG. 7 (*a*), CRSs (R0, R1, R2, R3) of four antenna ports are allocated within a 1RB so as not to overlap time-frequency resources. In the LTE system, when the CRS is mapped with the time-frequency resources, a reference signal of one antenna port on a frequency axis is mapped with one resource element (RE) per six REs. Since one RB includes twelve REs on the frequency axis, two REs per one RB are used as the RE for one antenna port.

FIG. 7 (*b*) illustrates a pattern of a reference signal R0 for antenna port 0 within 1 RB.

The LTE-A system which is an evolved version of the LTE system should be designed in such a manner that the base station can support maximum eight transmitting antennas for downlink transmission. Accordingly, reference signals for maximum eight transmitting antennas should also be supported. In the LTE system, since downlink reference signals are defined for maximum four antenna ports, if the base station includes maximum eight downlink transmitting antennas in the LTE-A system, reference signals for these antenna ports should be defined and designed additionally. The reference signals for maximum eight transmitting antenna ports should be designed for two types of reference signals, i.e., reference signal for channel measurement and reference signal for data demodulation.

One of important considerations in designing the LTE-A system is backward compatibility. Namely, backward compatibility means that the LTE user equipment should be operated normally even in the LTE-A system without any problem and the system should also support such normal operation. In view of reference signal transmission, reference signals for maximum eight transmitting antenna ports should be defined additionally in the time-frequency domain on which CRS defined in the LTE is transmitted to all bands per subframe. However, in the LTE-A system, if reference signal patterns for maximum eight transmitting antennas are added to all bands per subframe in the same manner as the CRS of the existing LTE system, overhead caused by reference signal transmission becomes too great.

Accordingly, the reference signal designed newly in the LTE-A system can be divided into two types. Examples of the two types of reference signals include a channel state information-reference signal (CSI-RS) (or may be referred to as channel state indication-RS (CSI-RS) for channel measurement for selection of modulation and coding scheme (MCS) and precoding matrix index (PMI), and a data demodulation-reference signal (DM-RS) for demodulation of data transmitted to eight transmitting antennas. The CSI-RS for channel measurement is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS. Accordingly, in order to reduce overhead caused by CSI-RS transmission, the base station intermittently transmits the CSI-RS on the time axis, and, for data demodulation, transmits a dedicated DM-RS to the user equipment scheduled on the corresponding time-frequency domain. In other words, the DM-RS of a specific user equipment is only transmitted to the region where the corresponding user equipment is scheduled, i.e., the time-frequency domain that can receive data.

Although detailed design of CSI-RS transmission has not been determined in the LTE-A system, the base station should transmit CSI-RSs for all the antenna ports. If the base station transmits CSI-RSs for maximum eight transmitting antennas per subframe, it may cause great overhead. Accordingly, the base station does not transmit CSI-RSs per subframe but transmits the CSI-RSs intermittently on the time axis, thereby reducing overhead. In other words, the base station transmits CSI-RSs either periodically with a period of integer multiple of one subframe or at a specific transmission pattern. At this time, the base station can configure a transmission period or pattern of the CSI-RS.

In order to measure the CSI-RS, the user equipment need to know information as to time-frequency location of the CSI-RS for each antenna port of a cell to which the user equipment belongs, CSI-RS sequence and CSI-RS frequency shift. Since the user equipment need to obtain downlink channel state by measuring the CSI-RS transmitted from base station, it should be transmitted to all bands unlike the DRS. Then, the user equipment feeds channel information such as CQI of each band, PMI, and rank back to the base station by using the received CSI-RS, and the base station performs scheduling operation by using the channel information fed back thereto. In this case, if the CSI-RS for the LTE-A user equipment is also transmitted to the LTE user equipment, it may cause overhead. This is because that the LTE user equipment does not know the presence of the CSI-RS and the base station performs puncturing for the corresponding REs if the CSI-RS is transmitted to the LTE user equipment in the scheduling resource region.

Accordingly, the present invention suggests a method for transmitting CSI-RS to several subbands to minimize an influence of the CSI-RS on the LTE user equipment and reduce overhead of CSI-RS, which affects the system.

Figure 8:
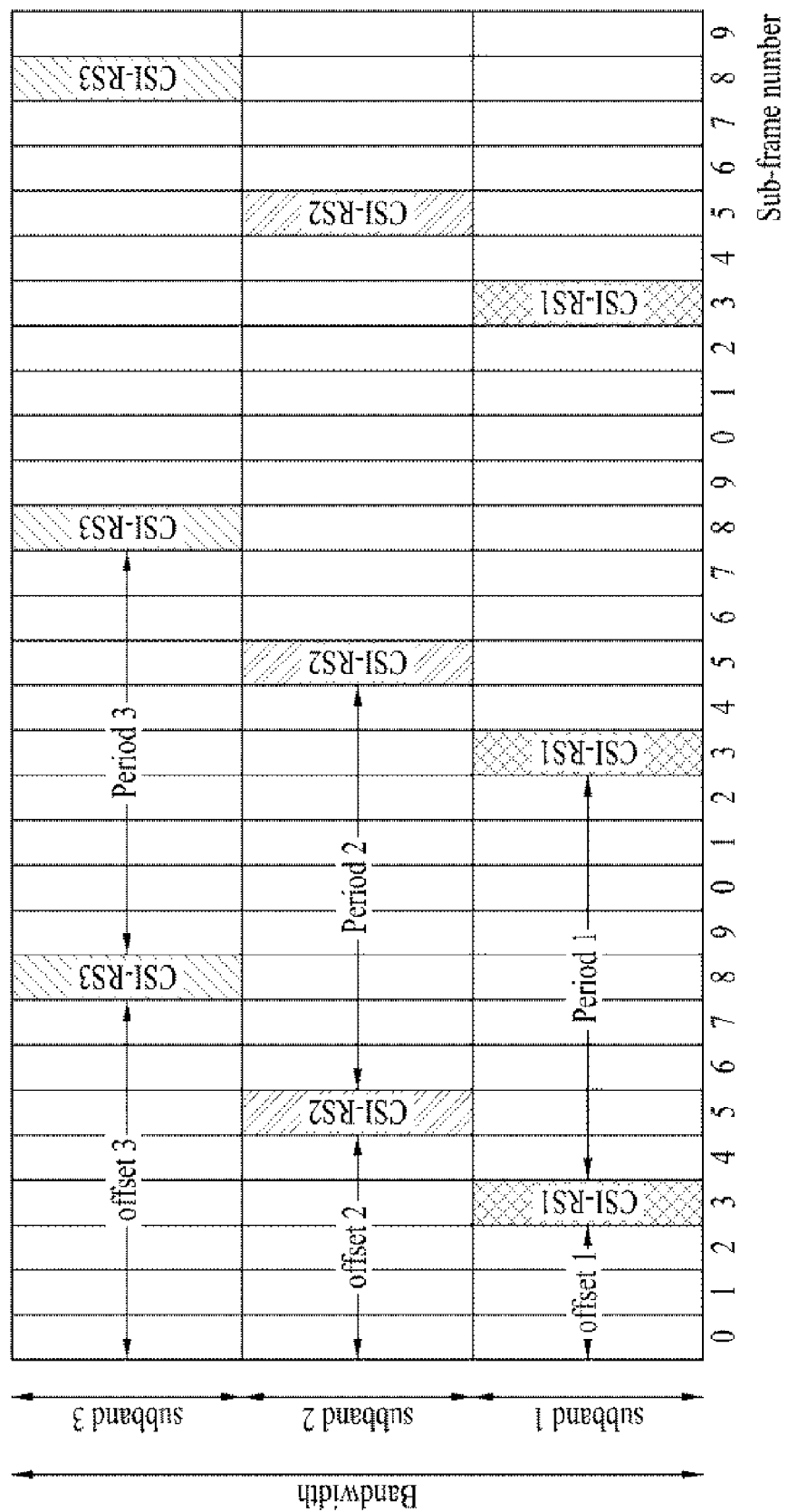
FIG. 8 is a diagram illustrating an example of time-frequency location to which CSI-RS is transmitted in a 3GPP LTE system which is an example of a mobile communication system.

FIG. 8 is a diagram illustrating an example of time-frequency location to which CSI-RS is transmitted in a 3GPP LTE system which is an example of a mobile communication system.

Referring to the FIG. 8, when the base station transmits a CSI-RS in a specific subframe, it can transmit the CSI-RS from some band not all bands. Namely, after all bands are divided into several subbands, the CSI-RSs for the respective subbands may be transmitted at different times.

As shown in the FIG. 8, it is assumed that all bands are divided into N subbands. In this case, the CSI-RS at each of N subbands has a period of CSI-RS transmission. The CSI-RSs at the respective N subbands have different transmission offsets (or offset values). The CSI-RSs at the respective subbands are transmitted at different times according to the offsets. In this case, offset means an interval from a start point of each subband to the time when the CSI-RS is first transmitted. For example, the base station may transmit the CSI-RSs by dividing all downlink bands into three subbands. CSI-RSs transmitted from subband 1, subband 2, and subband 3 will be referred to as CSI-RS1, CSI-RS2, and CSI-RS3, respectively. The CSI-RS1 to CSI-RS3 have different offset values, offset 1 to offset 3, for the transmission time. Also, the CSI-RS1 to CSI-RS3 can be transmitted from each subband with a period of period 1 to period 3 corresponding to the respective CSI-RS transmission periods. At this time, offset 1 to offset 3 may have the same value. In this case, the CSI-RSs are not transmitted to several subbands but transmitted to all bands at the same time. Also, period 1 to period 3 corresponding to the CSI-RS transmission periods of each subband may be managed with one parameter, CSI-RS period. Namely, the CSI-RS periods at all subbands may be managed equally. Since the CSI-RS is cell-specific information, the base station should broadcast CSI-RS information to the user equipment within a cell. At this time, the information broadcasted by the base station can include the number (N) of subbands to which the CSI-RS is transmitted, CSI-RS transmission offset per subband, and CSI-RS period.

If the base station transmits the CSI-RSs as shown in the pattern of the FIG. 8, the user equipment identifies downlink channel state by measuring the CSI-RSs and feeds its channel information (CQI, PMI, RI (Rank indicator), etc.) back to the base station. Then, the base station performs scheduling as to where space it will transmit data to what user equipment through what frequency band in accordance with what modulation and coding scheme (MCS) by using the information fed back from the user equipment. However, if the base station transmits the CSI-RSs to several subbands as described above, the user equipment acquires channel information only for a specific band to which the CSI-RS is transmitted, whereby the user equipment has no option but to transmit only the channel information (CQI, PMI, RI, etc.) for the specific band to the base station. As a result, a problem occurs in that the base station cannot perform scheduling for all bands. Even though the base station performs scheduling for all bands, scheduling is performed in a state that there is no channel information of a subband other than the subband to which the CSI-RS is transmitted or under the inaccurate state, whereby system throughput may be deteriorated.

Accordingly, in order to solve the above problem, channel feedback using DRS (may be referred to as DM-RS) is suggested. Namely, the user equipment measures channel state of the downlink by using the DRS transmitted together with downlink data in the scheduling region for downlink data demodulation and feeds the measured channel state back to the base station.

The base station does not transmit the CSI-RS per subframe but transmits the same with a multiple period of subframe, thereby reducing overhead caused by reference signal transmission. Unlike this, the base station always transmits data and DRS together. Separately, the DRS can additionally be used to obtain more exact channel state than the channel state measured by feedback of CQI, etc.

The base station transmits the CSI-RS to the user equipment, and the user equipment determines optimized channel quality information (CQI) for a downlink channel and PMI (channel direction information, etc.) by receiving the corresponding CSI-RS and feeds the determined information back to the base station. After receiving the channel information from each user equipment within the cell, the base station allocates a specific time-frequency resource to the user equipment and determines MCS level of transmission data and a precoder based on the reported channel information. The base station performs scheduling for the user equipment which will transmit downlink data, by using the channel information fed back from each user equipment. When transmitting a PDSCH to the scheduled user equipment, the base station should transmit DRS (DM-RS) (hereinafter, referred to as 'DM-RS') together with the PDSCH.

Currently, in the LTE standard, IEEE 802.16m standard, which is an example of the mobile communication system standard, a precoder is independently determined per cell where channel information is reported, and a single user is restricted to use a specific time-frequency resource, whereby the base station of each cell is likely to use the reported PMI and CQI without any change. Namely, the channel information transmitted from the user equipment to the base station can be regarded as useful information within the time when the channel is not changed largely. Accordingly, the user equipment does not need to continue to report the channel information through an uplink channel as far as the channel is not changed largely, and control signaling for channel information does not exist.

It is expected that the LTE-A system, which is the standard of the next generation mobile communication system, will support a coordinated multi point (CoMP) system and a multi user-MIMO (MU-MIMO) system, which have not been supported by the existing standard, so as to improve a data transmission rate. In this case, the CoMP system means that two or more base stations or cells perform communication with a user equipment by coordinating with each other to improve communication throughput between the base station (cell or sector) and the user equipment located in a shaded zone. Examples of the CoMP system include a coordinated MIMO type joint processing (CoMP-JP) system through data sharing and a CoMP-coordinated scheduling/beamforming (CoMP-CS) system. According to the joint processing (CoMP-JP) system, the user equipment can simultaneously receive data from each base station that performs CoMP, and can improve receiving throughput by combining the signals received from each base station. Unlike this joint processing system, according to the coordinated scheduling/beamforming (CoMP-CS) system, the user equipment can momentarily receive data through beamforming from one base station. The MU-MIMO system means that the base station allocates each antenna resource to different user equipments, and is to perform scheduling by selecting a user equipment that enables high data rate per antenna. This MU-MIMO system is to improve system throughput.

If this improved transmission technology is used in the LTE-A system, the PMI reported by the user equipment is likely to be only used as reference information for downlink transmission instead of being used as it is. Namely, the PMI reported by the user equipment is different from a precoder for actual downlink transmission. As a result, the CQI reported by the user equipment may be a value different from CQI that can be obtained during actual reception. Under the circumstances, the user equipment needs to recalculate CQI based on the precoder used by the base station and feed the recalculated CQI back to the base station. The user equipment can recalculate channel state information (CSI) and CQI by using the DM-RS uniformly distributed in the downlink data region. In this way, the user equipment that receives a PDSCH calculates channel information by using the DM-RS and feeds the channel information back to the base station, whereby the base station can obtain more exact channel information.

Figure 9:
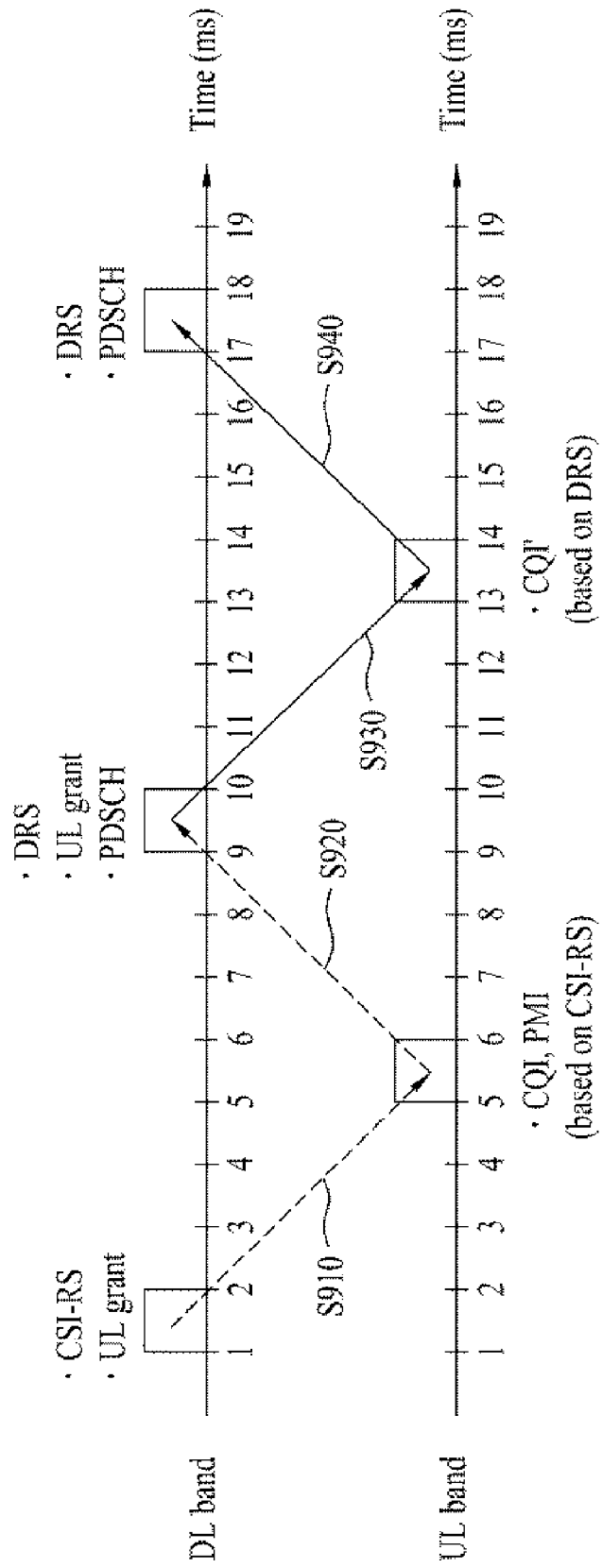
FIG. 9 is a diagram illustrating an example of a method for feeding channel information back using DM-RS according to the present invention.

FIG. 9 is a diagram illustrating an example of a method for feeding channel information back using DM-RS according to the present invention.

Although an uplink and a downlink are managed in accordance with a frequency division duplex (FDD) system, for example, in FIG. 9, the present invention is not limited to the FDD system and can equally be applied to a time division duplex (TDD) system. Arrows marked with dotted lines represent the existing control signal and procedure for downlink transmission while arrows marked with solid lines represent control signal and procedure newly added for CQI update.

The base station transmits the CSI-RS to the user equipment, and transmits UL grant to a specific user equipment so as to feed channel information back to the specific user equipment (S910). The user equipment receives the CSI-RS, determines CQI, PMI, etc. per subband for the CSI-RS, and feeds the determined channel information back to the base station by using time and frequency resources indicated by the UL grant (S920). When performing CoMP with a coordinated cell, such as joint transmission and beam avoidance, the user equipment should consider both PMI of a serving cell and PMI of the coordinated cell. Accordingly, it is expected that calculation amount of PMI and CQI will be increased. Although processing time is varied depending on the capability of the user equipment and PMI size, PMI and CQI are supposed to be calculated within 3 ms, whereby the user equipment can perform feedback periodically by giving UL grant to a specific frequency behind 4 ms after receiving the CSI-RS.

The base station performs scheduling for the user equipment, which will transmit downlink data, by using the channel information fed back from each user equipment, and should transmit DM-RS together with the PDSCH to the scheduled user equipment (S930). The CSI-RS is transmitted intermittently on the time axis, but the DM-RS is always transmitted together with data, whereby the user equipment can acquire more exact channel information by using the DM-RS. Namely, the user equipment which has received the PDSCH calculates the channel information (CQI, PMI, etc.) by using the DM-RS and feeds the channel information back to the base station (S940). Since the base station obtains the channel information more frequently than the CSI-RS period, it can use more exact information during scheduling.

A method for transmitting CSI-RS and DM-RS in a subband unit by combining the aforementioned method for transmitting CSI-RS in a subband unit with the method for feeding channel information back by using DM-RS will be described with reference to FIG. 10.

Figure 10:
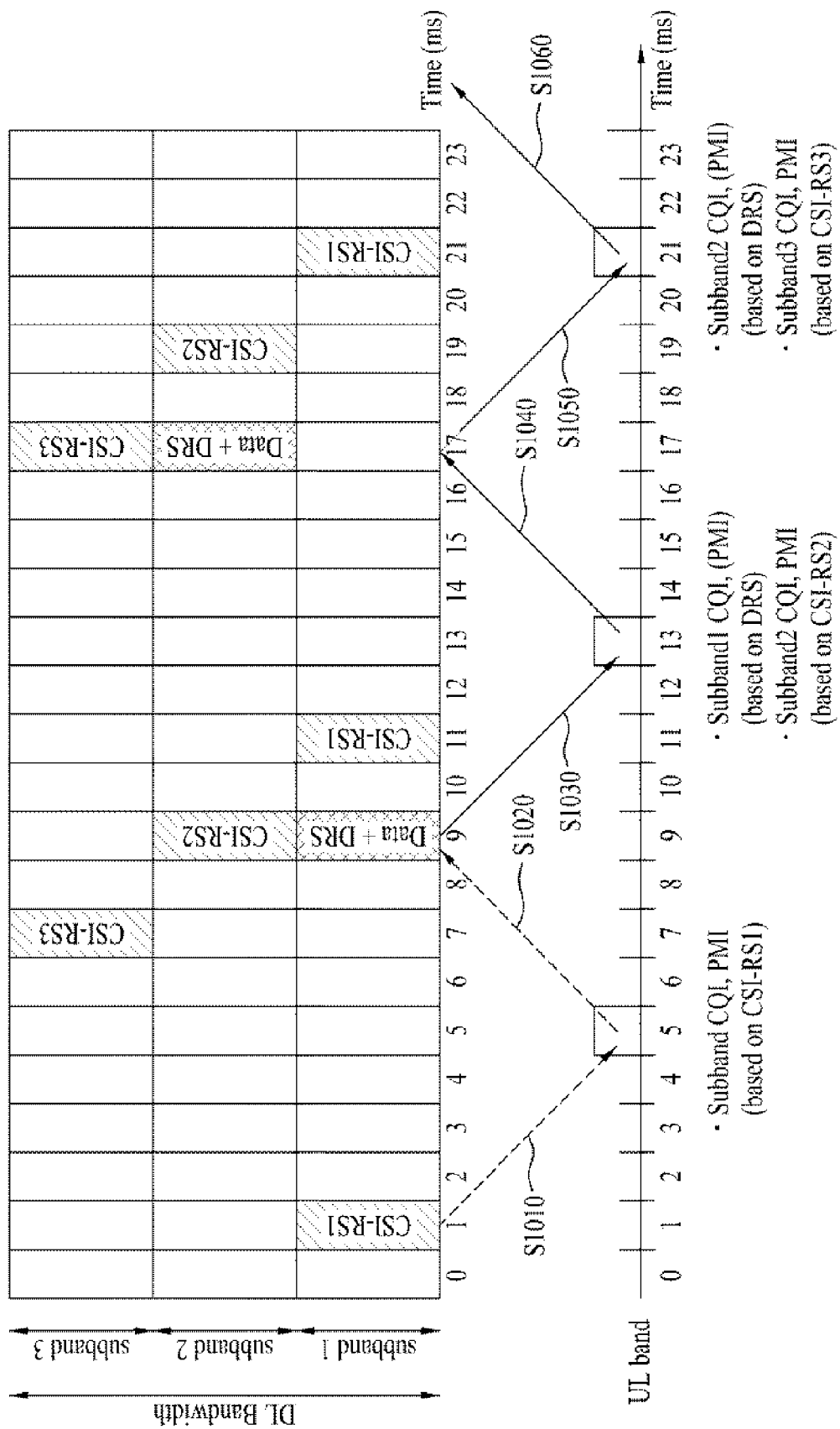
FIG. 10 is a diagram illustrating an example of a method for transmitting CSI-RS and DM-RS together in a subband unit in a 3GPP LTE-A system which is an example of a mobile communication system.

FIG. 10 is a diagram illustrating an example of a method for transmitting CSI-RS and DM-RS together in a subband unit in a 3GPP LTE-A system which is an example of a mobile communication system.

Referring to FIG. 10, if the base station transmits CSI-RS (i.e., CSI-RS1) for subband 1 in a subframe 1 (S1010), the user equipment has no option but to acquire channel information for subband 1. Accordingly, the user equipment feeds the channel information (CQI, PMI, etc.) for subband 1 back to the base station by using the CSI-RS1 (S1020). Afterwards, the base station performs scheduling at subband 1 by using this information, and if a specific user equipment is scheduled at subband 1, the base station can transmits DM-RS together with data of the scheduled user equipment (S1030). In other words, the scheduled user equipment receives the DM-RS together with data through subframe 9 from the base station, and if CSI-RS (CSI-RS2) for subband 2 is transmitted from the subframe 9, the user equipment measures channel state by receiving CSI-RS2. All user equipments within a cell feed channel information for subband 2 back to the base station by using CSI-RS2 and at the same time, the user equipment scheduled at the subband 1 feeds the channel information for the subband 1 back to the base station by using the DM-RS transmitted from the subband 1 (S1040).

It is assumed that the base station performs scheduling for a specific user equipment at subband 2 of a subframe 17 by using the channel information for the subband 1 and the subband 2. The scheduled user equipment receives data from the subband 2 and at the same time DM-RS (S1050). At this time, if CSI-RS (CSI-RS3) for the subband 3 is transmitted, the user equipment feeds channel information for subband 3 back to the base station by using the CSI-RS3, and also feeds channel information for the subband 2 back to the base station by using the DM-RS (S1060).

Since the CSI-RS is the information that can be received by all the user equipments, if the CSI-RS is transmitted per subband, all the user equipments feed channel information for each subband back to the base station. However, since the DM-RS transmitted together with data can be received by the scheduled specific user equipment only, only the user equipment scheduled by the corresponding time-frequency resource perform channel feedback by using the DM-RS.

The method for transmitting CSI-RS to several subbands as suggested in the present invention can reduce load of the LTE user equipment by reducing overhead of the CSI-RS transmitted to one subframe. Also, considering that CQI report is performed in a subband unit in the existing LTE system, the method for transmitting CSI-RS to subbands is more preferable. At this time, the subband where CQI feedback is performed may be different from the subband to which CSI-RS is transmitted.

Also, the method suggested in the present invention is advantageous in that it facilitates CSI-RS and DM-RS design. In particular, 1.25 MHz at the center of the LTE system corresponds to a band to which system information such as a synchronizing channel (SCH), a paging channel (PCH) and a broadcast channel (BCH) is transmitted. Although CSI-RS should be designed for other symbols except for the symbol through which the system information is transmitted, resources that can transmit CSI-RS are insufficient in the corresponding band. The CSI-RS is transmitted in a way that RE is punctured in the PDSCH region. However, such CSI- RS transmission through puncturing of RE to which system information is transmitted in the corresponding 1.25 MHz region is not preferably in view of the system. This is because that system information is prior to CSI-RS. If the method suggested in the present invention is used, it is easy to design the CSI-RS so as not to collide with system information.

In order that the user equipment feeds downlink channel information back to the base station by using the DM-RS, signaling for indicating feedback is required for the user equipment. Since channel measurement of the user equipment is generally based on the CSI-RS, the base station needs to instruct the user equipment to perform channel measurement based on the DM-RS and report operation of the channel measurement.

As the first method for instructing the operation, the present invention suggests that the base station explicitly adds the operation to a corresponding DL grant message.

FIG. 11 is a diagram illustrating explicit signaling of a PDCCH for DM-RS based CSI (or CQI) report in a 3GPP LTE-A system which is an example of a mobile communication system.

Referring to FIG. 11, a field (for example, 1 bit) instructing the user equipment to measure a channel by using the DM-RS and report the measured channel can be added to a DL grant message for scheduling a PDSCH of the user equipment. Namely, a field for "DM-RS based CSI report" is added to the DL grant message, and if DM-RS based CSI report of the user equipment is instructed from the corresponding field, the user equipment should report CSI to the base station by measuring the DM-RS. In order to represent a request of CQI report based on the DM-RS, if a CQI report field is set to '1' and signaled to the user equipment, the user equipment measures CQI by using the received DM-RS and feeds the measured CQI back to the base station.

As another method for instructing the operation, the present invention suggests that the base station notifies the user equipment of DM-RS based CSI-report command implicitly. For example, if the base station transmits control information, which instructs DM-RS based CSI report, to the user equipment, a scrambling code or cyclic redundancy check (CRC) mask used when a PDCCH that transmits scheduling information of the PDSCH is generated is used. In order to increase a PDCCH receiving success rate of the user equipment when the base station transmits a PDCCH to the user equipment and to add an error detection function to the PDCCH, 16-bit CRC can be added to each PDCCH. When the base station intends to instruct DM-RS based CQI report, it transmits the PDCCH by using CRC different from that used when transmitting a PDCCH for general PDSCH scheduling, whereby the base station can implicitly indicate the DM-RS based CSI report command for the user equipment. When the PDCCH is masked using a specific CRC, DM-RS based CSI report of the user equipment should be scheduled between the base station and the user equipment. Alternatively, when the base station schedules the PDSCH, combination of redundancy version (RV), RB size, and specific MCS level used for PDSCH scheduling is scheduled between the base station and the user equipment as a command instructing DM-RS based CSI report of the user equipment, whereby the base station can implicitly support the corresponding command.

Figure 12:
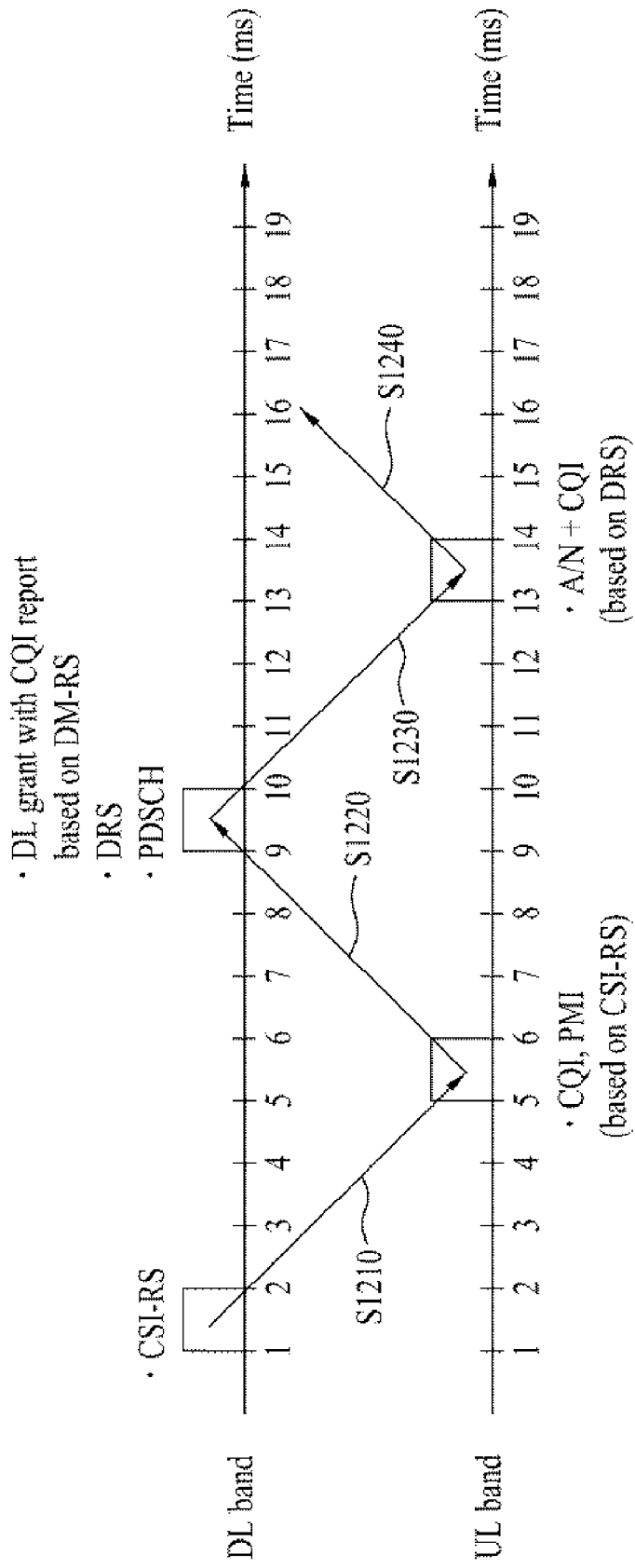
FIG. 12 is a diagram illustrating a series of processes for DM-RS based CSI (or CQI) report in a 3GPP LTE-A system which is an example of a mobile communication system.

FIG. 12 is a diagram illustrating a series of processes for DM-RS based CSI (or CQI) report in a 3GPP LTE-A system which is an example of a mobile communication system.

Although an uplink and a downlink are managed in accordance with a frequency division duplex (FDD) system, for example, in FIG. 12, the present invention is not limited to the FDD system and can equally be applied to a time division duplex (TDD) system.

The base station transmits the CSI-RS to the user equipment within the cell (S1210). The user equipment which has received the CSI-RS feeds channel information determined for CQI and PMI per subband back to the base station (S1220). The base station selects CQI and PMI by using the received CSI-RS based feedback information and performs scheduling for the user equipment. Basic operation of CSI feedback of the user equipment is to report a value obtained by estimating a channel through CSI-RS measurement. As described above, in case of a single user operation, it is likely that the base station uses the value calculated by measuring the CSI-RS and fed back from the user equipment as it is. The main motivation for feedback of the DM-RS based CSI is that the MU-MIMO or CoMP system is used. However, when scheduling is performed in accordance with the MU-MIMO system or the CoMP system, it is required to correct CQI or PMI value. In this case, when the base station instructs the user equipment to perform DM-RS based CSI report for correction of CQI and PMI, it is preferable to request DM-RS based CSI report for control of MCS at the time when scheduling is performed by the current PDCCH instead of full CSI report. Since the DL grant that schedules the PDSCH already includes MCS and PMI information of the PDSCH, the base station allows the user equipment to transmit only information as to whether the value measured using the actual DM-RS is higher or lower (Δ MCS) than actually scheduled MCS. THE base station can transmit DL grant for DM-RS based CQI report, PDSCH and DM-RS to the scheduled user equipment (S1230). Afterwards, the scheduled user equipment can transmit CQI measured based on the DM-RS to the base station together with ACK/NACK signal (S1240). At this time, in order that the user equipment reports DM-RS based CSI to the base station, the base station should allocate a resource for feedback of corresponding information to the user equipment. The user equipment instructed to perform DM-RS based CSI report can transmit corresponding channel information together with ACK/NACK signal at the time when ACK/NACK signal for downlink data transmission is transmitted if capacity of channel information to be reported is not great. If the user equipment measures a channel by using the DM-RS, PMI information other CQI may not be transmitted. In this case, the user equipment can transmit CQI together with ACK/NACK information for PDSCH transmission. The user equipment can transmit ACK/NACK signal and CQI by using a PUCCH format 2 defined in the LTE system, wherein the PUCCH format 2 allows simultaneous transmission of ACK/NACK signal and CQI.

The present invention suggests that the user equipment performs CSI report to the base station by using different (quasi) orthogonal resources (for example, CAZAC sequence) and/or Walsh code from the time-frequency resources allocated for uplink ACK/NACK signal for PDSCH transmission of the base station as resources to be used for DM-RS based CSI report.

Namely, dynamic ACK/NACK signal and DM-RS based CSI from the same time and frequency resources are multiplexed in accordance with a code division multiplexing (CDM) mode. These resources are located in a mixed PUCCH RB pair where the ACK/NACK signal and CQI are transmitted at the same time. If the mixed RBs are insufficient, continuous neighboring RBs are changed to the mixed RBs to enable such multiplexing. Also, a mixed RB pair set may be provided to different resource regions separately from the existing mixed RBs.

Also, in order to allocate an uplink resource for DM-RS based CSI report of the user equipment, the base station may allocate a resource for dynamic ACK/NACK signal transmission to the corresponding user equipment, and the corresponding user equipment may report DM-RS based CSI through the allocated resource. When the base station generates a PDCCH of the user equipment, basic unit of the PDCCH is a control channel element (CCE). Namely, the PDCCH includes one or more CCEs, and uplink ACK/NACK resources of the user equipment for downlink PDSCH are implicitly allocated to the first CCE index of the PDCCH that schedules the corresponding PDSCH. Accordingly, if a PDCCH for PDSCH scheduling of the user equipment instructed by the base station to perform DM-RS based CSI report includes a plurality of CCEs, the user equipment transmits ACK/NACK signal for the PDSCH of the base station through the uplink resources implicitly allocated by the first CCE index and reports DM-RS based CSI to the base station through uplink resources implicitly allocated by next CCE index.

The method for implicitly allocating uplink resources through CCE index behind the second CCE index is the same as the existing method for allocating ACK/NACK resources but its use is different from that of the existing method. As downlink PDCCH CCE aggregation is forcibly varied depending on DM-RS based CSI feedback size, additional PUCCH resource can be obtained, whereby reserved dynamic ACK/NACK resource can be controlled. The user equipment mainly operated in accordance with a MU-MIMO mode or a CoMP mode is likely to be the user equipment located at the cell edge. In this case, the PDCCH for scheduling the cell edge user equipment includes a plurality of CCEs instead of one CCE, whereby PDCCH throughput can be improved.

Unlike the above method, the user equipment which has received the DM-RS based CQI (CSI) report command may separately reserve a resource to be used for CQI report. In this case, location, size, etc. of the corresponding resource should previously be scheduled by higher layer signaling between the base station and the user equipment. The reserved resource can usually be used for data transmission of another user equipment. However, the user equipment which has received the DM-RS based CQI report command reports CQI to a corresponding specific location. Since this command is sent from the base station to the user equipment, it is regarded that the base station has already allocated the corresponding resource to the user equipment which is required to perform DM-RS based CQI report.

Also, since periodical feedback resource should basically be allocated for channel information feedback of the user equipment, the present invention suggests a method for using a feedback resource periodically allocated. This periodical feedback resource can be allocated to a PUCCH (Physical Uplink Control Channel) or PUSCH (Physical Uplink Shared Channel) region. This means that the periodical resource allocated for uplink control feedback of the user equipment is used through stealing. The user equipment which has received the DM-RS based CQI report reports DM-RS based CQI not CSI-RS based CQI to only the corresponding resource block (RB) to which data are allocated at the uplink periodical feedback time closest to the time when the corresponding DL grant message is received, by considering the processing time of the user equipment. To this end, the size of PDSCH allocation RBs of the user equipment should be greater than or equal to the size of CQI subband which is basic unit for CQI report of the user equipment. The base station can detect that CQI of the corresponding RB (or subband) of the user equipment is the DM-RS based CQI not the CSI-RS based CQI.

However, the aforementioned method for stealing the periodical PUCCH resource may cause restriction in managing a scheduler of the base station. Accordingly, it is more preferable that a separate periodical PUCCH resource is additionally allocated for DM-RS based CSI report. For actual feedback, the user equipment should perform the DM-RS based CSI report by using only one of the resource allocated for CSI-RS based CSI feedback and the resource allocated for DM-RS based CSI feedback. The base station can notify the user equipment of additional resource through higher layer signaling.

It has been described in FIG. 12 that the user equipment transmits HARQ ACK/NACK feedback information and DM-RS based CQI report together after four subframes at the PDSCH transmission time of the base station. The base station can notify the user equipment of a PUCCH resource to be used for DM-RS based CQI report through RRC signaling by previously designating the PUCCH resource. At this time, since the PUCCH resource for CQI report is different from the PUCCH resource for ACK/NACK signal transmission, the user equipment may transmit two PUCCHs at the same time. However, if the user equipment transmits two PUCCHs at the same time, single-carrier property at the uplink is damaged, whereby complexity of a transmitting amplifier of the user equipment is increased. Accordingly, the user equipment can transmit two kinds of information to one PUCCH through the PUCCH resource allocated for CQI report by a PUCCH format 2a or a PUCCH format 2b to which CQI and the ACK/NACK signal defined in the LTE system are transmitted at the same time.

The present invention suggests another method for transmitting CQI information by implicitly adding HARQ ACK/NACK information to the CQI information. For example, it is supposed that the user equipment feeds a supportable MCS level obtained by the measuring DM-RS transmitted from the base station. In this case, if the user equipment transmits MCS level greater than that of the PDSCH transmitted together with the DM-RS, it means indicating ACK signal. If the user equipment transmits MCS level smaller than that of the PDSCH transmitted together with the DM-RS, it means indicating NACK signal. Namely, the MCS level of the PDSCH transmitted from the base station through a downlink is compared with a supportable maximum MCS level calculated using the DM-RS received by the user equipment. As a result, if the MCS level calculated using the DM-RS is greater than that of the PDSCH, it means NACK signal. In opposite case, it means ACK signal.

In view of the base station, if the DM-RS based CSI (or CQI) is received, and if the MCS level smaller than that of the PDSCH previously transmitted to the corresponding resource region is fed back to the base station, the base station regards that NACK signal is received for the corresponding PDSCH. By contrast, if the MCS level greater than that of the PDSCH previously transmitted to the corresponding resource region is fed back to the base station, the base station regards that ACK signal is received for the corresponding PDSCH. In view of the user equipment, if the supportable MCS level calculated using the DM-RS is smaller than that of the received PDSCH, and if the user equipment intends to transmit MCS smaller than the MCS level of the PDSCH through DM-RS based CSI (CQI), it means that the user equipment implicitly transmits NACK signal for the corresponding PDSCH together with corresponding information. In opposite case, it means that user equipment transmits ACK signal.

In the current LTE system, the PDSCH is selected from 29 MCS levels and then transmitted. 29 MCS levels are configured by combination of 27 transport block sizes (TBS) and three modulation modes as illustrated in Table 3 below.

TABLE 3

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

MCS levels having the same transport block size (TBS) but different modulation modes exist. These MCS levels are selected depending on a selective fading level of a channel. Accordingly, in the aforementioned method, the user equipment feeds the supportable MCS level calculated by measuring the DM-RS back to the base station as CQI information. At this time, if the user equipment transmits the transport block size (TBS) of the supportable MCS level greater than the transport block size of the PDSCH transmitted together with the DM-RS, it may implicitly indicate that the user equipment transmits ACK signal for the previously transmitted PDSCH. In opposite case, it may implicitly indicate that the user equipment transmits NACK signal for the previously transmitted PDSCH. If the transport block size (TBS) of the feedback MCS level is equal to the TBS of the PDSCH transmitted together with the DM-RS, the user equipment can notify the base station that it implicitly indicates any one of the ACK signal and the NACK signal, in accordance with a rule previously defined.

Also, when the transport block size (TBS) of the MCS level fed back from the user equipment is equal to the transport block size (TBS) of the PDSCH transmitted together with the DM-RS, if the MCS levels are equal to each other, the user equipment can notify the base station that it means the ACK signal for the previously transmitted PDSCH. If the MCS levels are different from each other, the user equipment can notify the base station that it means the NACK signal for the previously transmitted PDSCH.

In the aforementioned method, if the user equipment receives the PDCCH and PDSCH that require DM-RS based CQI report, it selects MCS level indicating ACK signal among the MCS levels in case of ACK in accordance with DM-RS measurement result, whereas it selects MCS level indicating NACK signal in case of NACK. As a result, the user equipment generates CQI information and feeds the generated CQI information and ACK/NACK information according to decoding of the PDSCH, back to the base station.

According to another example of the aforementioned method, the user equipment can feed the supportable transport block size (TBS) calculated by measuring the DM-RS to back to the base station as CQI information. In this case, if the transport block size (TBS) fed back to the base station is greater than or equal to the transport block size (TBS) of the PDSCH transmitted together with the DM-RS, the user equipment may notify the base station that it indicates ACK signal for the previously transmitted PDSCH. If the transport block size (TBS) fed back to the base station is smaller than the transport block size (TBS) of the PDSCH transmitted together with the DM-RS, the user equipment may notify the base station that it indicates NACK signal for the previously transmitted PDSCH. According to still another example of the aforementioned method, the user equipment can feed the difference between the supportable transport block size (TBS) calculated by measuring the DM-RS and the transport block size (TBS) of the PDSCH transmitted together with the DM-RS back to the base station as CQI information. When index of the supportable transport block size (TBS) is designated as I_tbs_s and index of the transport block size (TBS) of the transmitted PDSCH is designated as I_tbs_t, if a positive difference value corresponding to [I_tbs_s-I_tbs_t] is fed back to the base station, the user equipment can notify the base station that it indicates ACK signal for the previously transmitted PDSCH. On the other hand, if a negative difference value corresponding to [I_tbs_s-I_tbs_t] is fed back to the base station, the user equipment can notify the base station that it indicates NACK signal for the previously transmitted PDSCH. If a difference value of 0 corresponding to [I_tbs_s-I_tbs_t] is fed back to the base station, the user equipment may previously define one of the ACK signal and the NACK signal or selectively use two meanings as illustrated in Table 4 below.

TABLE 4

| DM-RS based CQI feedback index | I_tbs_s − I_tbs_t | A/N(ACK/NACK) |
|---|---|---|
| 0 | 0 | A |
| 1 | 0 | N |
| 2 | 1 | A |
| 3 | −1 | N |
| 4 | 2 | A |
| 5 | −2 | N |
| 6 | 3 | A |
| 7 | −3 | N |

The method suggested in Table 4 can be regarded that definition of CQI feedback information is varied depending on HARQ ACK/NACK information. Namely, Table 4 suggests that the user equipment explicitly feeds ACK/NACK information back to the base station and varies definition of CQI information field, which is fed back, in accordance with the ACK/NACK information. In the example of Table 4, transmission information includes a 1-bit ACK/NACK field and a 2-bit CQI field. In this case, the CQI field has information of an absolute value of [I_tbs_s-I_tbs_t]. If the ACK/

NACK field is ACK, [I_tbs_s-I_tbs_t] means a positive number. If the A/N field is NACK, [I_tbs_s-I_tbs_t] means a negative number.

According to another suggestion of the present invention, it is considered that the user equipment uses dynamic ACK/NACK resource connected to CCE index used for corresponding PDCCH transmission as PUCCH resource to be used for DM-RS based CQI report. Definition of the CQI information field, which is fed back, is varied depending on transmission ACK/NACK information. Maximum 2 bits can be transmitted through uplink dynamic ACK/NACK resource, and include a 1-bit ACK/NACK field and a 1-bit CQI field. Table 5 illustrates an example of this suggestion of the present invention.

TABLE 5

| DM-RS based CQI feedback bits | A/N(ACK/NACK) | CQI |
| --- | --- | --- |
| 00 | A | Request to keep MCS |
| 01 | A | Request to increase MCS |
| 10 | N | Request to keep MCS |
| 11 | N | Request to decrease MCS |

In a downlink MIMO transmission system, the PDSCH includes two codewords. In this case, the user equipment should feed ACK/NACK information and CQI information for each transport codeword back to the base station. If the PDSCH is transmitted with two codewords, corresponding PDCCH transmission is performed with two or more CCEs, whereby the user equipment is allocated with two dynamic ACK/NACK resources and feeds the dynamic ACK/NACK resources back to the base station at a total of 4 bits. In the DM-RS based CQI report system, in order to solve the problem of the damaged single-carrier property of the uplink signal of the user equipment, which is caused as CQI information and ACK/NACK information are transmitted together, the present invention suggests a method for respectively transmitting two kinds of information to different subframes.

Figure 13:
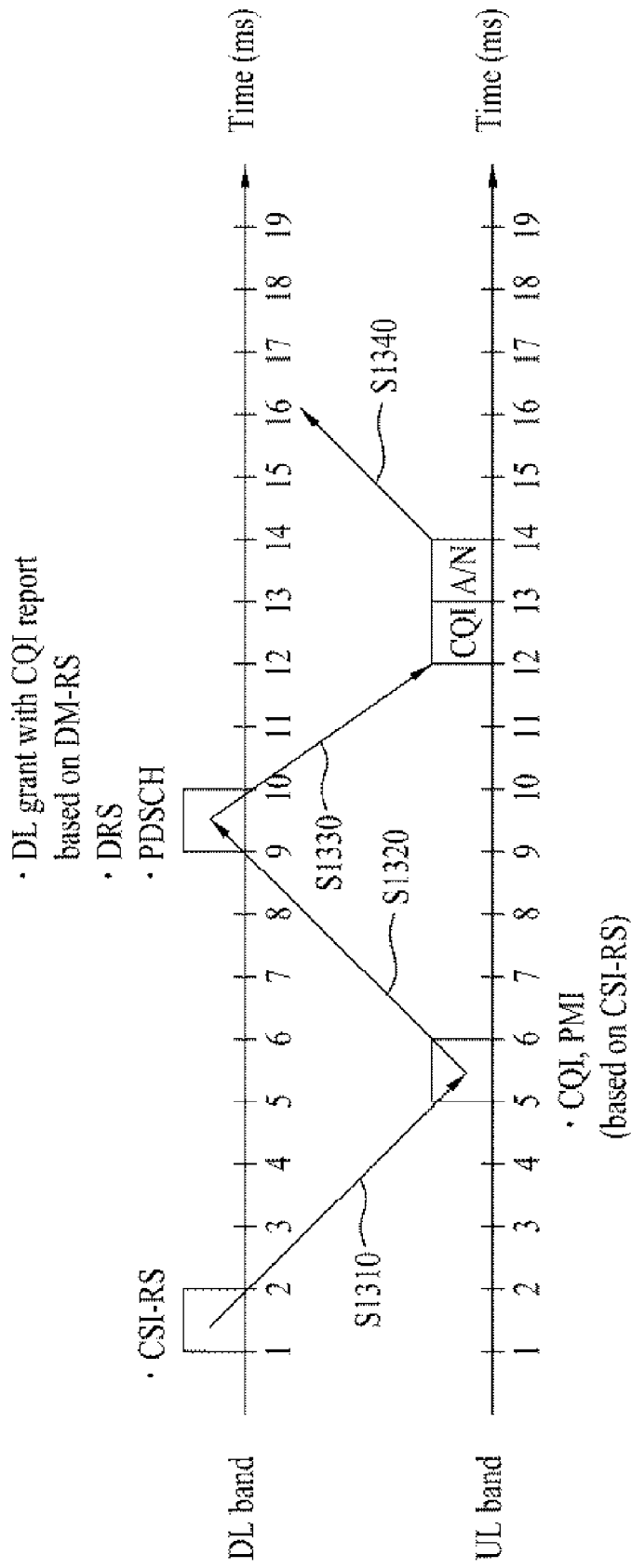
FIG. 13 is a diagram illustrating an example of a method for feeding channel state information back using DM-RS in a 3GPP LTE-A system which is an example of a mobile communication system.

FIG. 13 is a diagram illustrating an example of a method for feeding channel state information back using DM-RS in a 3GPP LTE-A system which is an example of a mobile communication system.

In FIG. 13, the user equipment transmits DM-RS based CQI report to the base station before transmitting HARQ ACK/NACK information via the uplink in response to the PDSCH transmitted from the base station. Referring to FIG. 13, if the base station transmits CSI-RS to the user equipment, the user equipment determines CQI, PMI, etc. per each subband for the received CSI-RS and feeds the determined channel information back to the base station.

At this time, after receiving the CSI-RS, the user equipment performs feedback at a specific frequency behind 4 ms, for example. The base station performs scheduling for the user equipment which will transmit downlink data, by using the channel state information fed back from the user equipment, and should transmit DM-RS to the scheduled user equipment together with the PDSCH when transmitting the PDSCH to the user equipment (S1330). The CSI-RS is transmitted intermittently on the time axis but the DM-RS is always transmitted together with data. Accordingly, the user equipment can acquire more exact channel information by using the DM-RS. In other words, the user equipment which has received the PDSCH calculates channel information (CQI, PMI, etc.) by using the DM-RS and feeds the calculated channel information back to the base station (S1340). Then, the user equipment transmits ACK signal or NACK signal, which indicates whether the PDSCH has been successfully received or not, to the base station.

In the system of FIG. 13, the user equipment can generate CQI information before acquiring ACK/NACK information and feed the generated CQI information back to the base station. In the system suggested in FIG. 13, the user equipment which has received PDCCH and PDSCH, which requires DM-RS based CQI report at the nth subframe, transmits CQI information to the base station through the (n+2)th or (n+3)th subframe and transmits ACK/NACK information to the base station through the (n+4)th subframe. In this case, the user equipment transmits the CQI information to a PUCCH resource previously designated by RRC signaling for CQI report, and transmits the ACK/NACK information to a PUCCH resource determined by a function of CCE index of the corresponding PDCCH.

Figure 14:
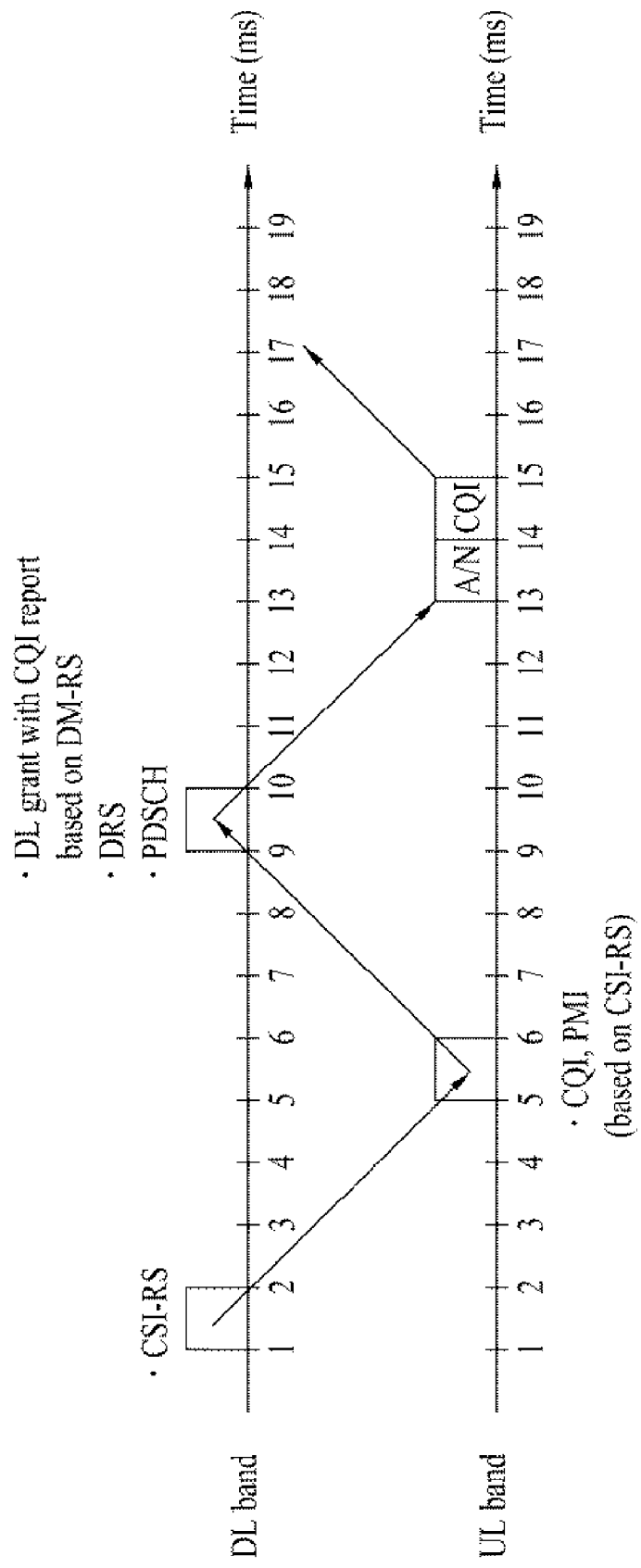
FIG. 14 is a diagram illustrating another example of a method for feeding channel state information back using DM-RS in a 3GPP LTE-A system which is an example of a mobile communication system.

FIG. 14 is a diagram illustrating another example of a method for feeding channel state information back using DM-RS in a 3GPP LTE-A system which is an example of a mobile communication system.

In FIG. 14, the same steps as the steps S1310 to S1330 of FIG. 13 are repeated. However, in the example illustrated in FIG. 14, the user equipment transmits DM-RS based CQI report to the base station after HARQ ACK/NACK information transmitted from the user equipment to the uplink in response to the PDSCH transmitted from the base station. In the embodiment of FIG. 14, the user equipment generates CQI information after acquiring ACK/NACK information for the PDSCH and feed the generated CQI information back to the base station. In this case, definition of the feedback CQI information can be varied depending on the ACK/NACK information. Alternatively, the ACK/NACK information is implicitly included in the CQI information, whereby the effect of ACK/NACK signal transmission to multiple subframes can be obtained.

Figure 15:
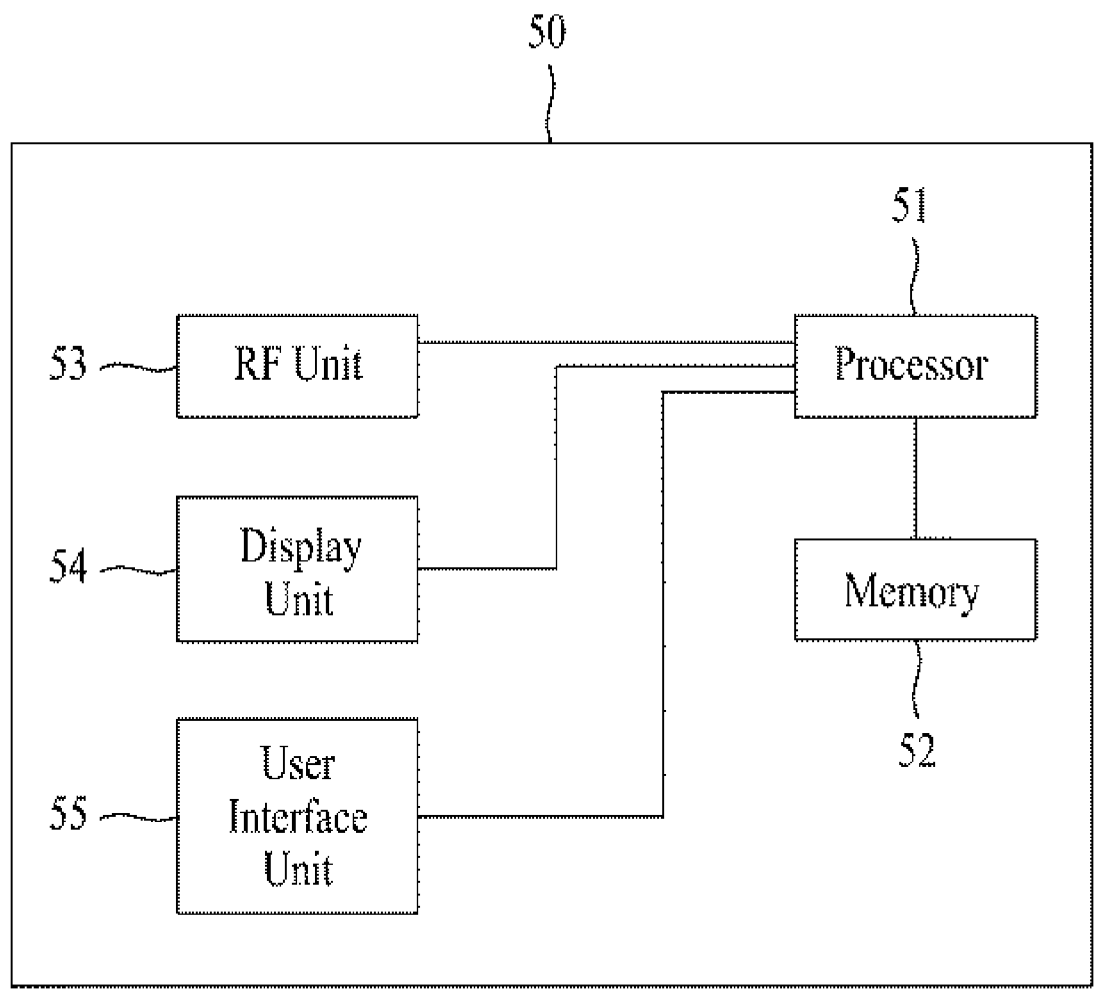
FIG. 15 is a diagram illustrating units of an apparatus 50.

FIG. 15 is a diagram illustrating modules of an apparatus 50.

Referring to FIG. 15, the apparatus 50 may be a user equipment or a base station. Also, the apparatus 50 includes a processor 51, a memory 52, a radio frequency (RF) unit 53, a display unit 54, and a user interface unit 55. Layers of a radio interface protocol are implemented within the processor 51. The processor 51 provides a control plane and a user plane. A function of each layer can be implemented within the processor 51. The processor 51 can include a contention resolution timer. The memory 52 is connected with the processor 51 and stores operating system, application, and general files therein. If the apparatus 50 is the user equipment (UE), the display unit 54 can display various kinds of information, and can be implemented using LCD (Liquid Crystal Display), OLED (Organic Light Emitting Diode), etc., which are known. The user interface unit 55 can be configured by combination of well known user interfaces such as key pad and touch screen. The RF unit 53 is connected with the processor 51 and transmits or receives a radio signal. The RF unit 53 includes a receiving module (not shown) that can receive a signal from the base station and a transmitting module (not shown) that can transmit a signal to the base station. The processor 51 can generate channel state information by measuring channel state based on signal and information received from the RF unit 53.

Layers of the radio interface protocol between the user equipment and the network can be divided into a first layer (L1), a second layer (L2) and a third layer (L3) based on three lower layers of an open system interconnection (OSI) model which is well known in the communication system. A physical layer (or PHY layer) belongs to the first layer, and provides an information transmission service through a physical channel. A radio resource control (RRC) layer belongs to the third layer and provides control radio resources between the UE and the network. The UE and the network exchange RRC messages through the RRC layer.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A method for transmitting channel state information at a user equipment (UE) in a mobile communication system, the method comprising:
   receiving a physical downlink control channel (PDCCH) from a base station (BS) through a first downlink subframe, the PDCCH including information indicating DeModulation-Reference Signal (DM-RS) based channel state report or not;
   receiving a physical downlink shared channel (PDSCH) through the first downlink subframe, the PDSCH including the DM-RS and data;
   measuring channel state using the received DM-RS if the information indicates the DM-RS based channel state report; and
   transmitting the measured channel state information to the base station through a first uplink subframe.

2. The method of claim 1, further comprising:
   receiving a channel state information-RS (CSI-RS) from the base station through a specific subband of a second downlink subframe; and
   measuring channel state for the specific subband by using the received CSI-RS and transmitting the measured channel state to the base station through a second uplink subframe,
   wherein the first downlink subframe is a subframe scheduled for the user equipment by the CSI-RS based channel state report.

3. The method of claim 1, wherein the information indicating the DM-RS based channel state report or not is a downlink assignment message type.

4. The method of claim 3, wherein indicating the DM-RS based channel state report or not is included in a channel quality information (CQI) report field within the downlink assignment message.

5. The method of claim 1, wherein the information indicating the DM-RS based channel state report or not is expressed by any one of a scrambling code or specific cyclic redundancy check (CRC) masking applied to the PDCCH defined previously, MCS level included in the PDCCH, resource block (RB) size, and combination of redundancy version (RV).

6. The method of claim 1, wherein the step of transmitting the measured channel state information to the base station through a first uplink subframe includes transmitting ACK (ACKnowledgment) signal or NACK (Non-ACKnowledgement) signal indicating whether the PDSCH of the first downlink subframe has been successfully received, together with the measured channel state information.

7. The method of claim 6, wherein the ACK or NACK signal and the channel state information measured based on the DM-RS are transmitted through different PUCCHs previously defined.

8. The method of claim 7, further comprising receiving information of different PUCCHs previously defined, from the base station through higher layer signaling.

9. The method of claim 6, wherein the ACK or NACK signal and the channel state information measured based on the DM-RS are transmitted through an uplink resource indicated by one or more CCEs of the PDCCH.

10. The method of claim 1, wherein an interval between the first downlink subframe and the first uplink subframe corresponds to four subframes.

11. An user equipment (UE) for transmitting channel state information in a mobile communication system, the user equipment comprising:
    a module receiving a physical downlink control channel (PDCCH) from a base station (BS) through a first downlink subframe, the PDCCH including information indicating DeModulation-Reference Signal (DM-RS) based channel state report or not;
    a module receiving a physical downlink shared channel (PDSCH) through the first downlink subframe, the PDSCH including the DM-RS and data;
    a processor measuring channel state using the received DM-RS if the information indicates the DM-RS based channel state report; and
    a module transmitting the measured channel state information to the base station through a first uplink subframe.

12. The user equipment of claim 11, further comprising:

a module receiving a channel state information-RS (CSI-RS) from the base station through a specific subband of a second downlink subframe; and a module measuring channel state for the specific subband by using the received CSI-RS and transmitting the measured channel state to the base station through a second uplink subframe, wherein the first downlink subframe is a subframe scheduled for the user equipment by the CSI-RS based channel state report.

13. The user equipment of claim 11, wherein the information indicating the DM-RS based channel state report or not is a downlink assignment message type.

14. The user equipment of claim 13, wherein indicating the DM-RS based channel state report or not is included in a channel quality information (CQI) report field within the downlink assignment message.

15. The user equipment of claim 11, wherein the information indicating the DM-RS based channel state report or not is expressed by any one of a scrambling code or specific cyclic redundancy check (CRC) masking applied to the PDCCH defined previously, MCS level include in the PDCCH, resource block (RB) size, and combination of redundancy version (RV).

16. The user equipment of claim 11, wherein the step of transmitting the measured channel state information to the base station through a first uplink subframe includes transmitting ACK (ACKnowledgment) signal or NACK (Non-ACKnowledgement) signal indicating whether the PDSCH of the first downlink subframe has been successfully received, together with the measured channel state information.

17. The user equipment of claim 16, wherein the ACK or NACK signal and the channel state information measured based on the DM-RS are transmitted through different PUCCHs previously defined.

18. The user equipment of claim 17, further comprising a module receiving information of different PUCCHs previously defined, from the base station through higher layer signaling.

19. The user equipment of claim 16, wherein the ACK or NACK signal and the channel state information measured based on the DM-RS are transmitted through an uplink resource indicated by one or more CCEs of the PDCCH.

20. The user equipment of claim 11, wherein an interval between the first downlink subframe and the first uplink subframe corresponds to four subframes.

\* \* \* \* \*